BEST AVAILABLE COPY
J. D. ROBERTSON.
SPEEDOMETER.
APPLICATION FILED JAN. 12, 1918.
1,386,953.
Patented Aug. 9, 1921.
15 SHEETS—SHEET 1.
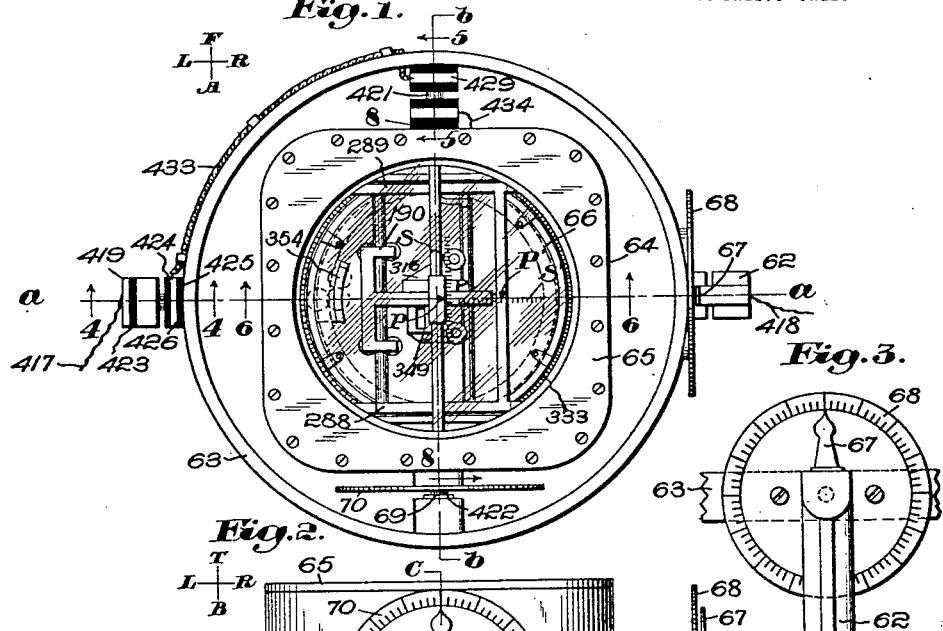
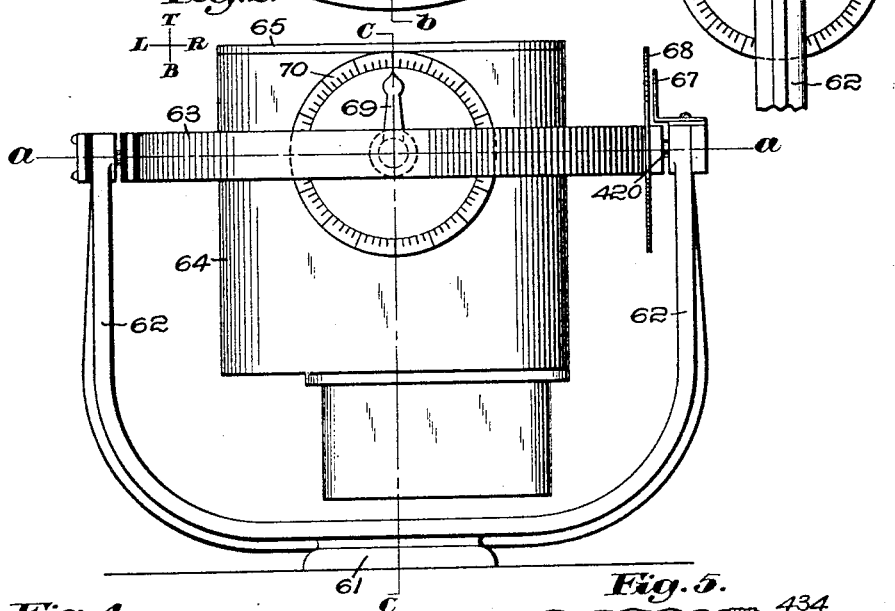
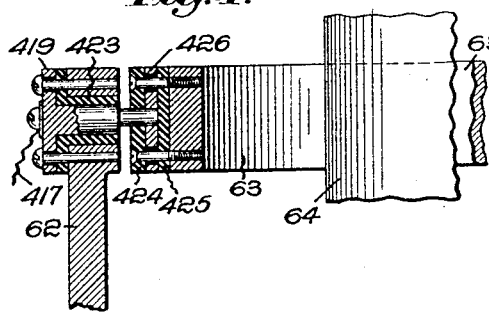
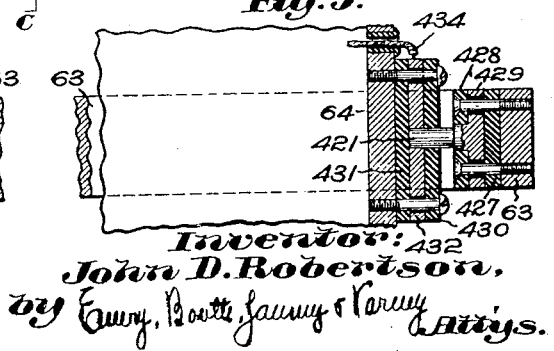
Inventor:
John D. Robertson,
by Emery, Booth, Janney & Varney
Attys.

J. D. ROBERTSON.
SPEEDOMETER.
APPLICATION FILED JAN. 12, 1918.

1,386,953.

Patented Aug. 9, 1921.
15 SHEETS—SHEET 2.

Inventor:
John D. Robertson,
by Emery, Booth, Janney & Varney, Attys.

BEST AVAILABLE COP'

J. D. ROBERTSON.
SPEEDOMETER.
APPLICATION FILED JAN. 12, 1918.

1,386,953.

Patented Aug. 9, 1921.
15 SHEETS—SHEET 3.

Inventor:
John D. Robertson,
by Emery, Booth, Janney & Varney, Attys.

J. D. ROBERTSON.
SPEEDOMETER.
APPLICATION FILED JAN. 12, 1918.
1,386,953.
Patented Aug. 9, 1921.
15 SHEETS—SHEET 4.
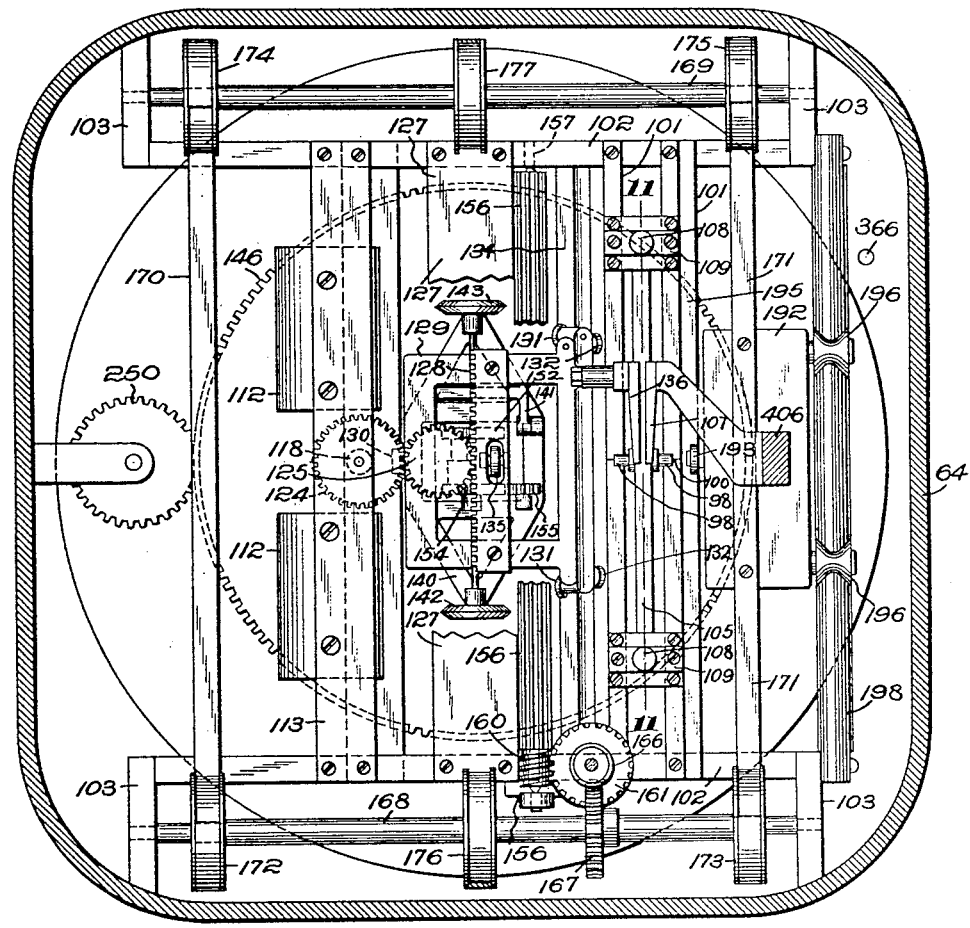

J. D. ROBERTSON.
SPEEDOMETER.
APPLICATION FILED JAN. 12, 1918.

1,386,953.

Patented Aug. 9, 1921.
15 SHEETS—SHEET 5.

Inventor:
John D. Robertson,
by Emery, Booth, Janney & Varney
Attys.

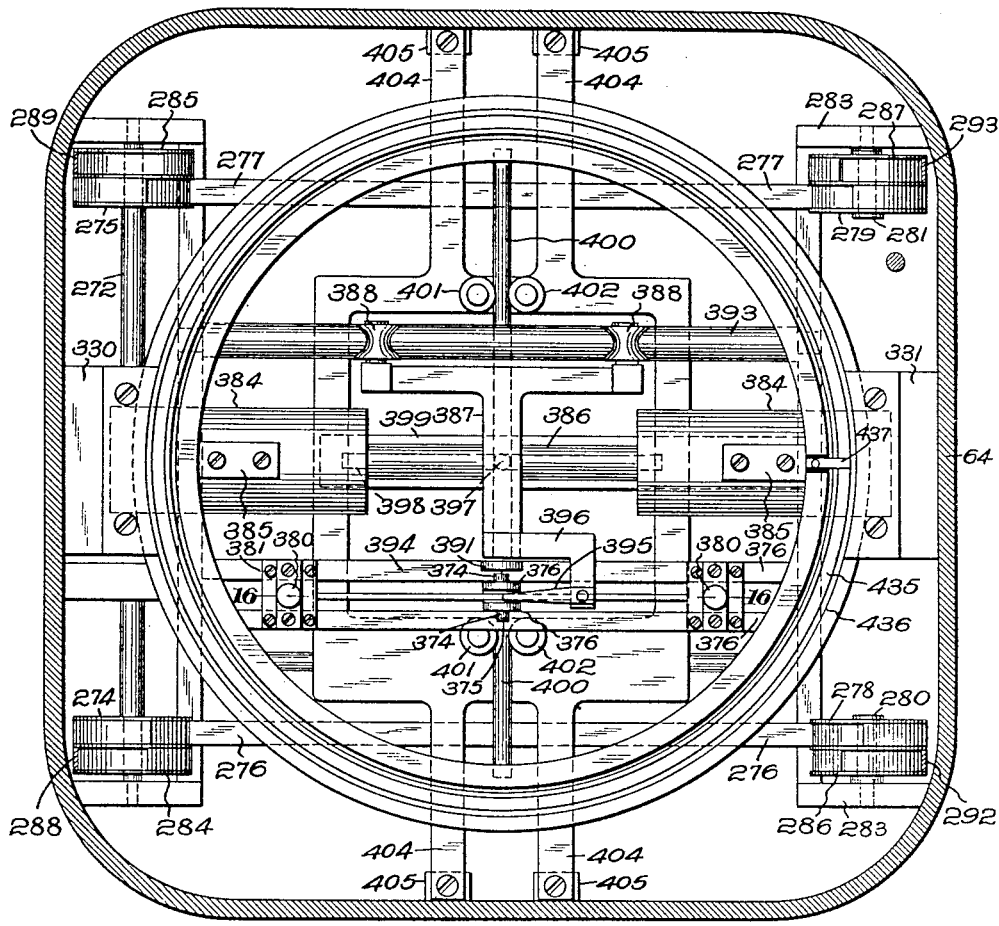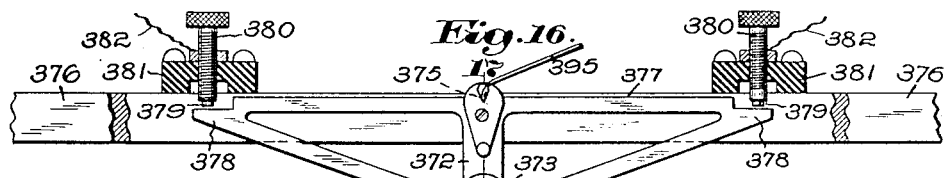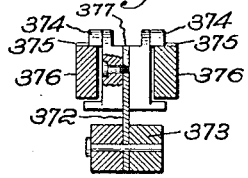

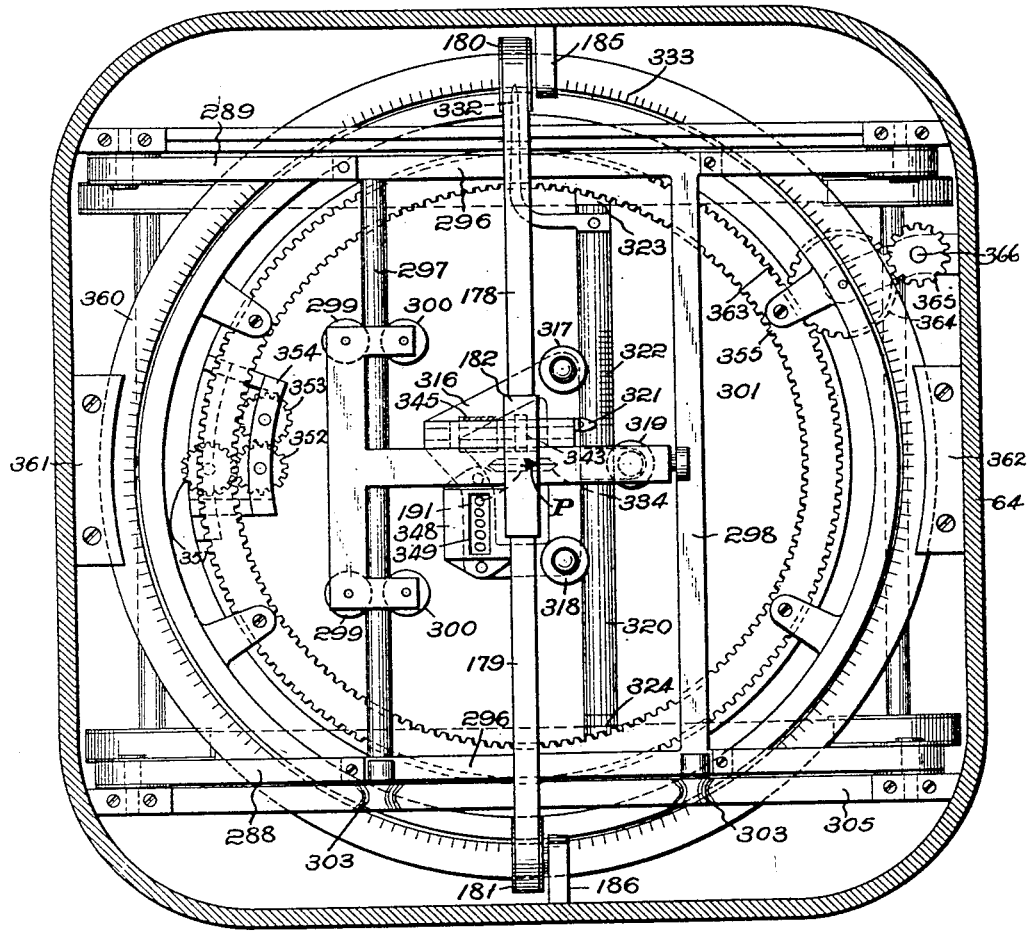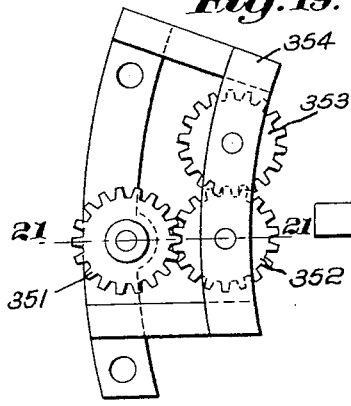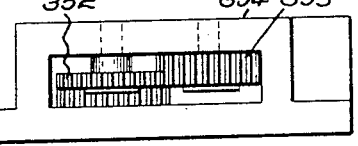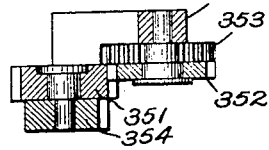

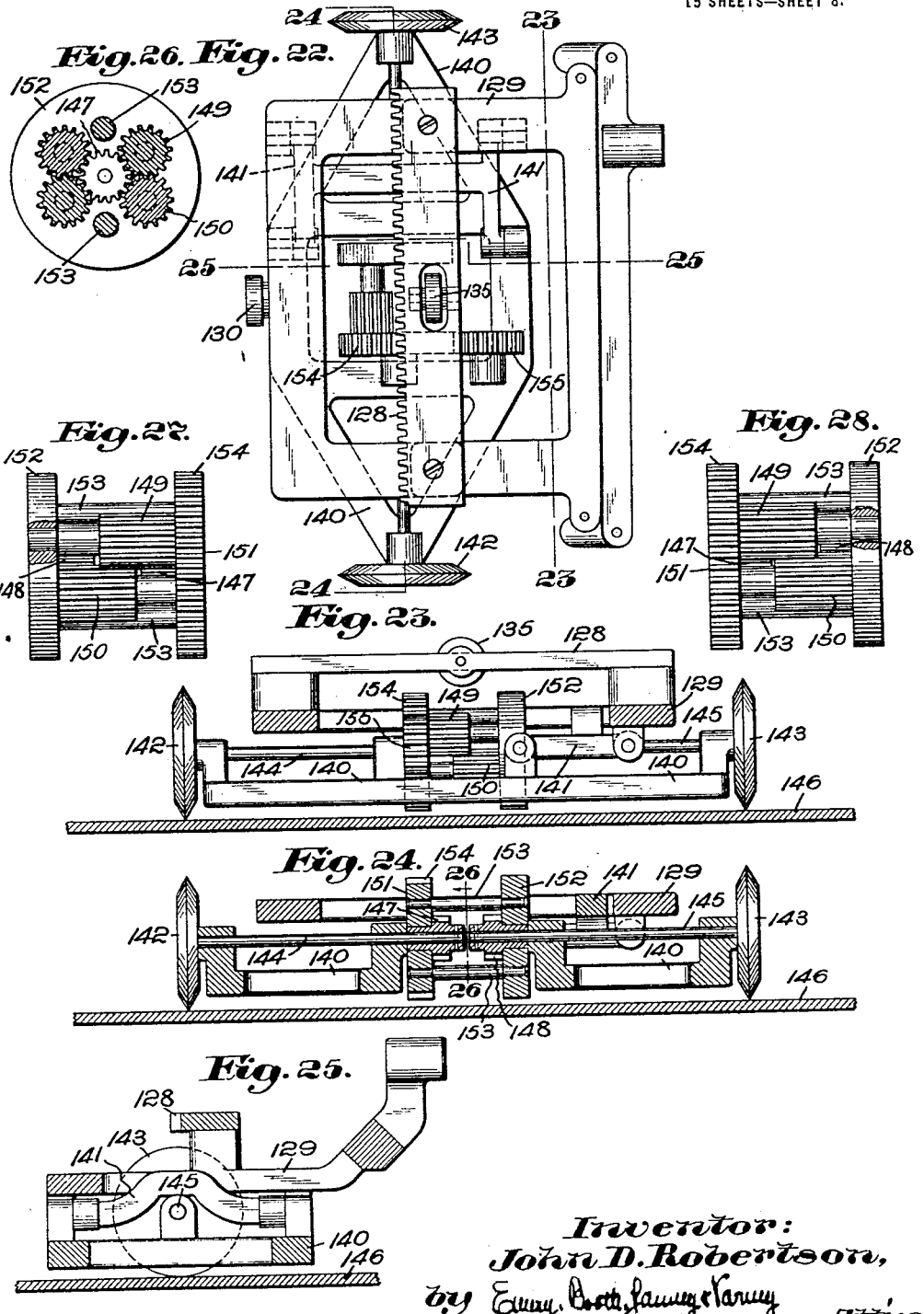

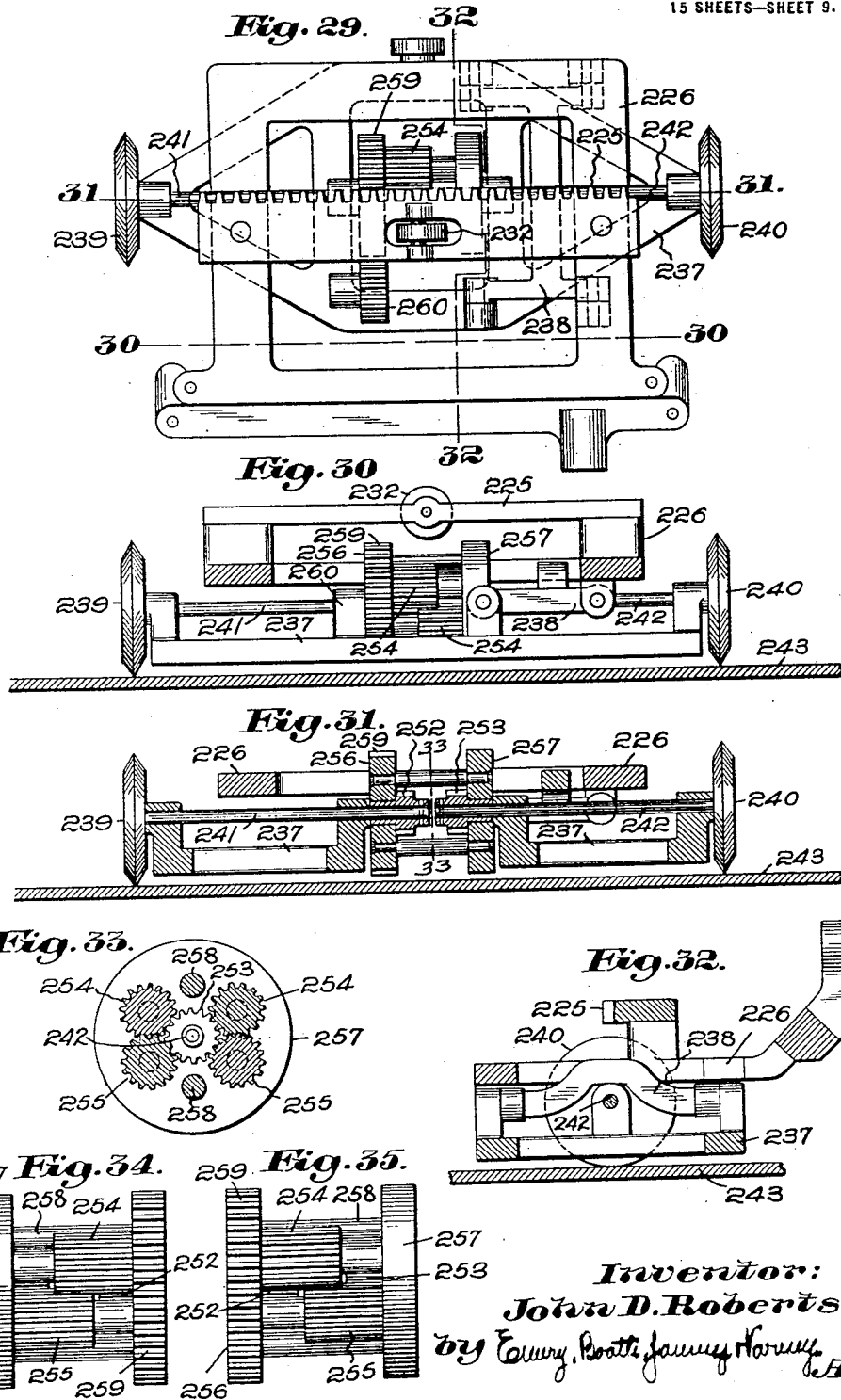

J. D. ROBERTSON.
SPEEDOMETER.
APPLICATION FILED JAN. 12, 1918.
1,386,953.
Patented Aug. 9, 1921.
15 SHEETS—SHEET 10.
BEST AVAILABLE COP'
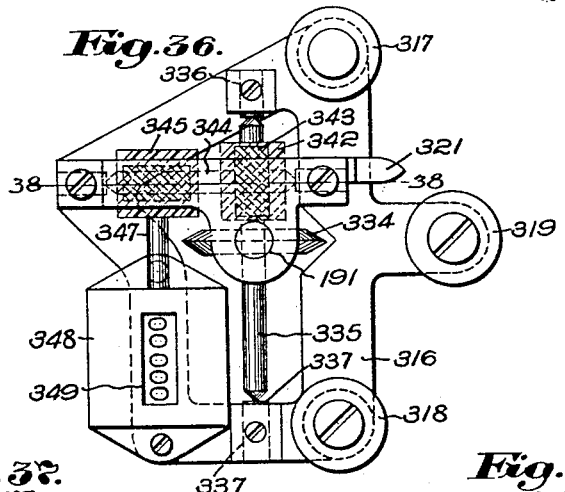
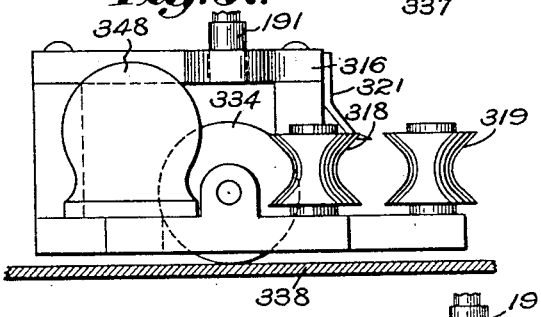
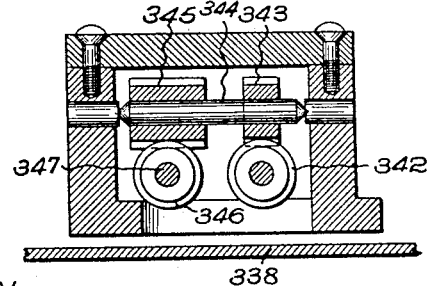
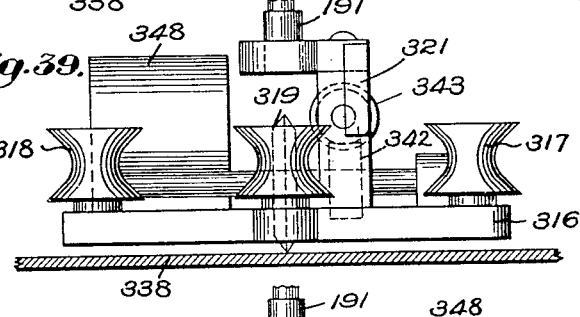
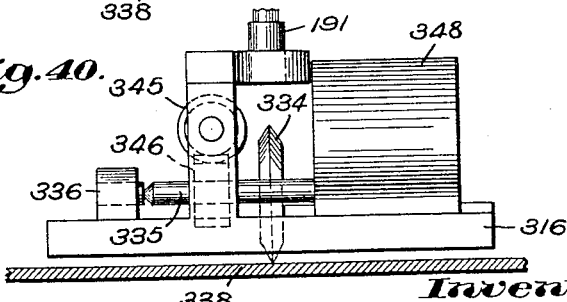
Inventor:
John D. Robertson,
by Emery, Booth, Janney & Varney, Attys.

J. D. ROBERTSON.
SPEEDOMETER.
APPLICATION FILED JAN. 12, 1918.

1,386,953.

Patented Aug. 9, 1921.
15 SHEETS—SHEET 11.

Inventor:
John D. Robertson.
by Emery, Booth, Janney & Varney
Attys.

J. D. ROBERTSON.
SPEEDOMETER.
APPLICATION FILED JAN. 12, 1918.

1,386,953.

Patented Aug. 9, 1921.
15 SHEETS—SHEET 12.

Inventor:
John D. Robertson.
by Emery, Booth, Janney & Varney.
Attys.

J. D. ROBERTSON.
SPEEDOMETER.
APPLICATION FILED JAN. 12, 1918.

1,386,953.

Patented Aug. 9, 1921.
15 SHEETS—SHEET 13.

Inventor:
John D. Robertson,
by Emery, Booth, Janney & Varney
Attys.

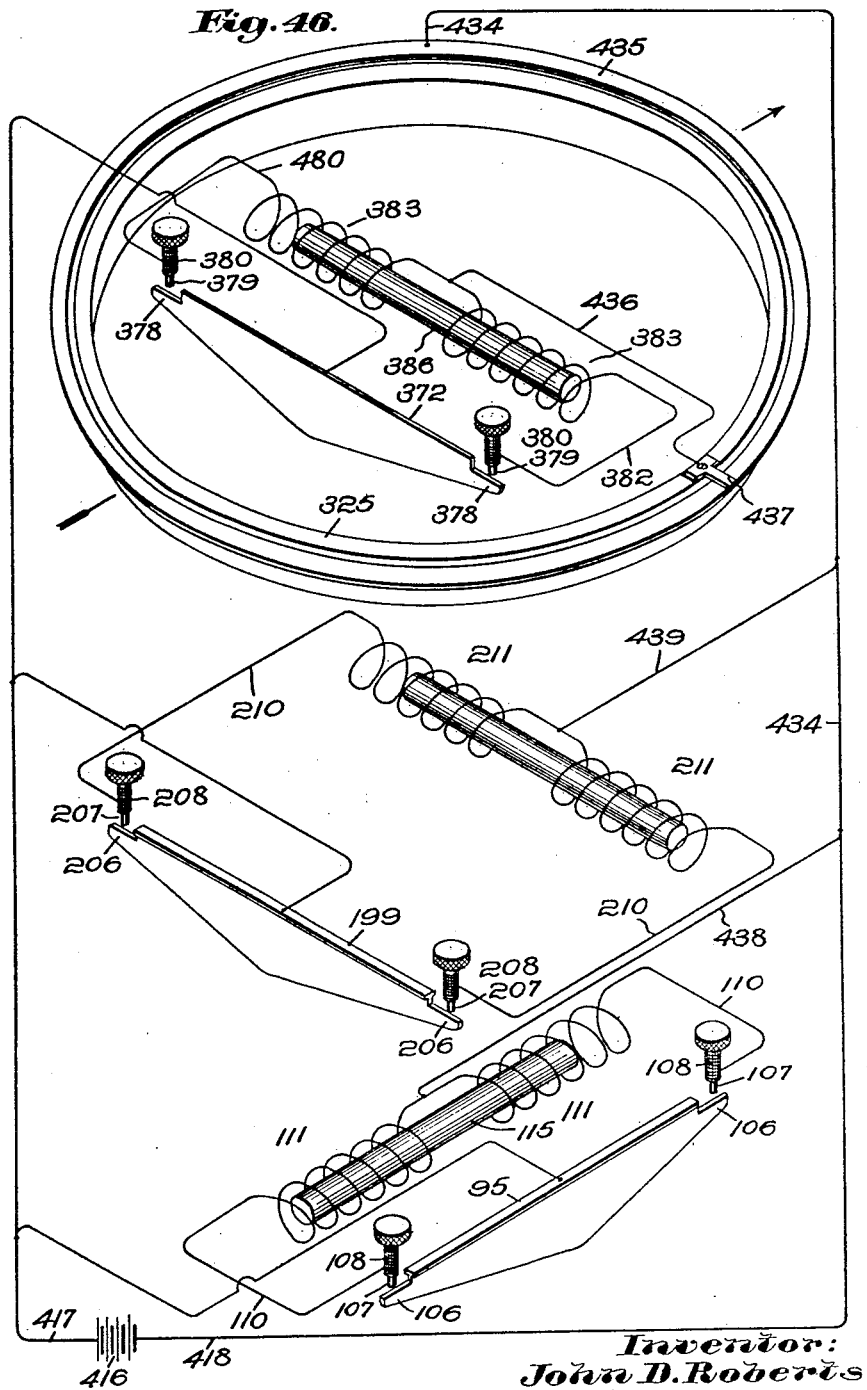

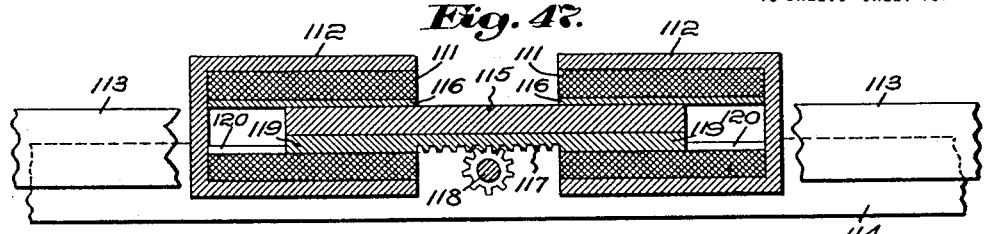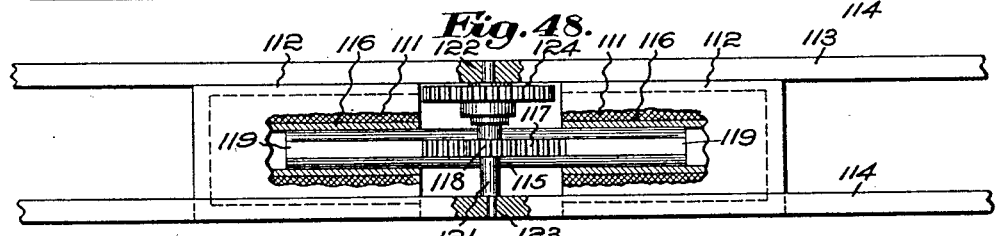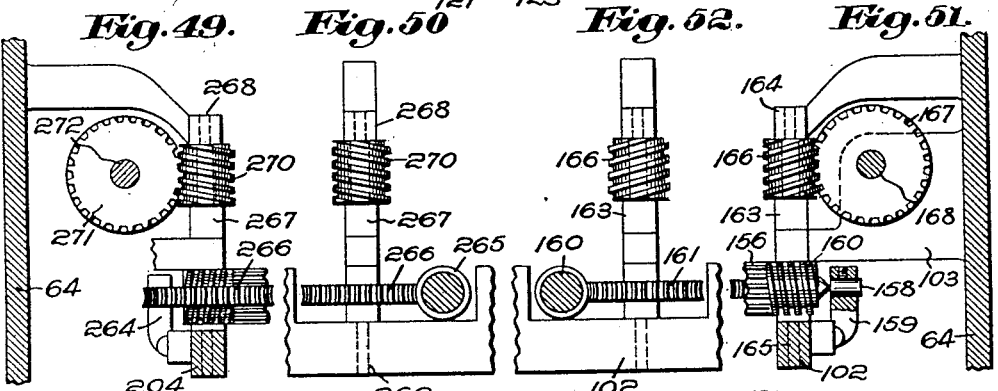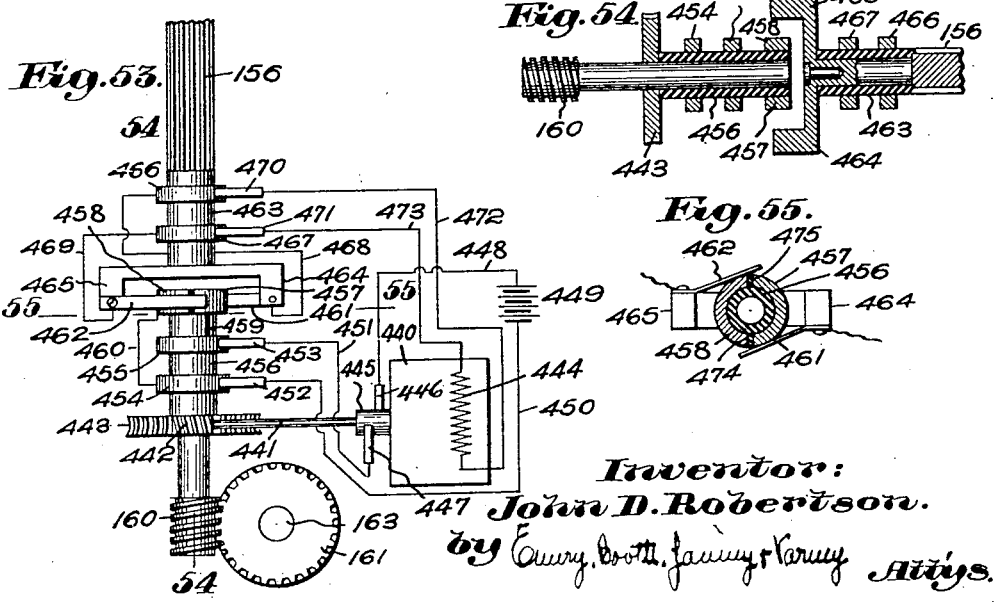

UNITED STATES PATENT OFFICE.

JOHN D. ROBERTSON, OF TAUNTON, MASSACHUSETTS, ASSIGNOR TO CHARLES J. ROBERTSON, OF TAUNTON, MASSACHUSETTS.

SPEEDOMETER.

1,386,953. Specification of Letters Patent. Patented Aug. 9, 1921.

Application filed January 12, 1918. Serial No. 211,500.

*To all whom it may concern:*

Be it known that I, JOHN D. ROBERTSON, a citizen of the United States, and a resident of Taunton, county of Bristol, and Commonwealth of Massachusetts, have invented an Improvement in Speedometers, of which the following description, in connection with the accompanying drawings, is a specification, like characters on the drawings representing like parts.

This invention relates to an instrument for ascertaining characteristics of motion of a moving body which carries the instrument. The moving body may be any air or water craft, or any vehicle traveling on land. My invention is more particularly concerned with an instrument for continuously furnishing direct readings of acceleration and retardation, fore and aft velocity, lateral velocity due to side drift, true velocity and direction, and the angle between such true direction and a fixed line which may be the fore and aft center line of the moving body, as well as for furnishing readings showing the angles of fore and aft and lateral inclination of the body.

Briefly stated, the instrument may be said to comprise a lateral acceleration and retardation responsive and integrating device to give sidewise speed, a longitudinal acceleration and retardation responsive and integrating device to give fore and aft speed, a device to add these two components of speed to show the true speed and the true direction of motion relative to the longitudinal center line of the craft, a true speed integrating device to give the true distance traveled, a centrifugal force responsive correcting device similar to the acceleration responsive devices, but maintained at right angles to the line of motion, a device to resolve the centrifugal force into components laterally and longitudinally of the craft, and means for applying these components to the lateral and longitudinal acceleration responsive devices as corrections.

It should here be noted that the instrument neglects differences in elevation of the moving body, but gives the horizontal component only of motion, speed and distance, (which herein is spoken of as true speed, distance, and direction), as it is this which is needed for mapping and charting. In other words, the instrument ignores up and down movements of the moving body, such for example as the ascending and descending movements of an aircraft or submersible craft, or the effects of wave action on the surface of the water, or the hills and valleys of the earth. In short, the instrument gives what is needed, viz: the distance on the map.

My invention will be best understood by reference to the following description, when taken in connection with the accompanying drawings of one illustrative embodiment thereof, while its scope will be more particularly pointed out in the appended claims.

For convenience in considering the drawings, I have marked each view with a symbol indicating direction, and in these symbols, the letters F—A, L—R and T—B indicate, respectively, fore and aft, right and left and top and bottom.

In the drawings:

Figure 1 is a plan of an instrument embodying my invention;

Fig. 2 is a rear elevation of the same;

Fig. 3 is a detail elevation of the fore and aft inclination indicating device, as viewed from the right-hand side of Figs. 1 and 2;

Fig. 4 is a detail, sectional view on line 4—4 of Fig. 1;

Fig. 5 is a detail, sectional view on line 5—5 of Fig. 1;

Fig. 10 is a plan section on line 10—10 of Fig. 6;

Fig. 11 is a detail, sectional view on line 11—11 of Fig. 10, showing the fore and aft acceleration and retardation responsive means comprising a pendulum;

Fig. 12 is a detail, sectional view on line 12—12 of Fig. 11;

Fig. 15 is a plan section on line 15—15 of Fig. 6;

Fig. 16 is a detail, sectional view on line 16—16 of Fig. 15, showing the centrifugal force responsive means comprising a pendulum;

Fig. 17 is a detail, sectional view on line 17—17 of Fig. 16;

Fig. 18 is a plan section on line 18—18 of Fig. 6;

Fig. 19 is a detail plan on an enlarged scale of a portion of the planetary gear set;

Fig. 20 is a detail elevation viewed from the right-hand side of Fig. 19;

Fig. 21 is a detail, sectional view on line 21—21 of Fig. 19;

Fig. 22 is a detail plan on an enlarged scale of the differential mechanism which is associated with the fore and aft acceleration and retardation responsive means, and which forms a part of the integrating means;

Fig. 23 is a detail, sectional view on line 23—23 of Fig. 22;

Fig. 24 is a detail, sectional view on line 24—24 of Fig. 22;

Fig. 25 is a detail, sectional view on line 25—25 of Fig. 22;

Fig. 26 is a detail, sectional view on line 26—26 of Fig. 24, illustrating the differential gearing;

Fig. 27 is an elevation of the differential gearing, viewed from the left-hand side of Fig. 26;

Fig. 28 is an end elevation of the differential gearing, viewed from the right-hand side of Fig. 26;

Fig. 29 is a detail plan, on an enlarged scale, of the differential mechanism which is associated with the lateral acceleration and retardation responsive means, and which forms a part of the integrating means;

Fig. 30 is a sectional view on line 30—30 if Fig. 29;

Fig. 31 is a sectional view on line 31—31 of Fig. 29;

Fig. 32 is a sectional view on line 32—32 of Fig. 29;

Fig. 33 is a sectional view on line 33—33 of Fig. 31, looking toward the left, showing the differential gearing;

Fig. 34 is an elevation of the differential gearing, viewed from the left-hand side of Fig. 33;

Fig. 35 is an elevation of the differential gearing, viewed from the right-hand side of Fig. 33;

Fig. 36 is a plan of a portion of the mechanism which adds the two components of speed to show the true speed, and which integrates the true speed to give the true distance traveled;

Fig. 37 is a rear elevation of the parts shown in Fig. 36;

Fig. 38 is a sectional view on line 38—38 of Fig. 36;

Fig. 39 is an elevation of the parts shown in Fig. 36, viewed from the right-hand side thereof;

Fig. 40 is an elevation of the parts shown in Fig. 36, viewed from the left-hand side thereof;

Fig. 46 is a skeletonized, perspective diagram of the electrical system of the instrument;

Fig. 47 is a detail, sectional view, on an enlarged scale, on line 47—47 of Fig. 6;

Fig. 48 is an elevation, partly in vertical section, of the parts shown in Fig. 47;

Fig. 49 is a rear elevation, partly in vertical section, of a portion of the mechanism which connects the lateral acceleration and retardation responsive devices with the true speed and true distance integrating devices;

Fig. 50 is a detail elevation, partly in vertical section, of some of the parts shown in Fig. 49, as viewed from the right-hand side thereof;

Fig. 51 is a detail elevation, partly in vertical section, of a portion of the mechanism which connects the fore and aft acceleration and retardation responsive device with the true speed and true distance integrating devices;

Fig. 52 is a detail elevation of some of the parts shown in Fig. 51, as viewed from the left-hand side thereof;

Figure 6:
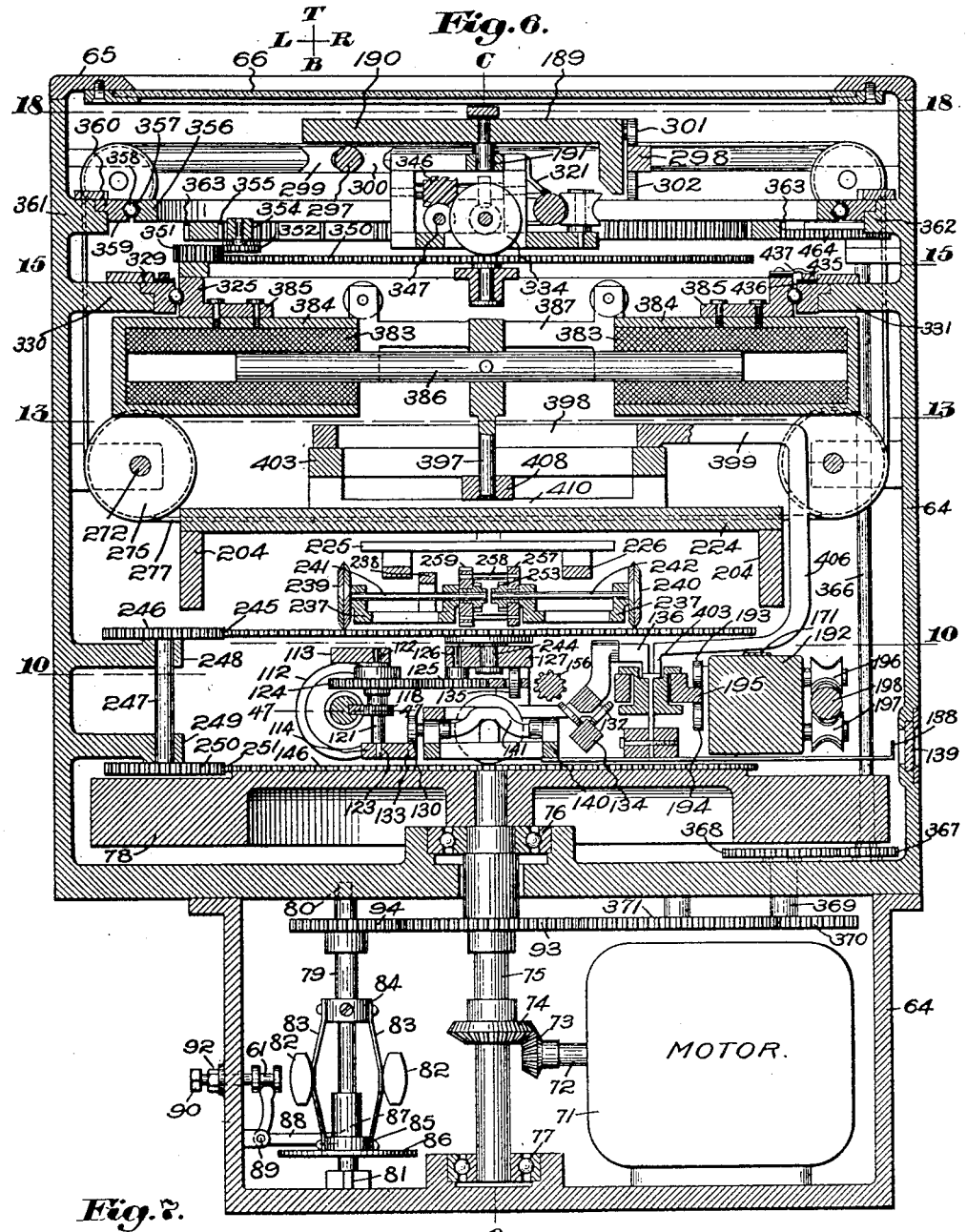
Fig. 6 is a sectional view on line 6—6 of Fig. 1, looking forward.

Fig. 53 is a detail plan view of a modification of the driving mechanism, connecting one of the acceleration and retardation responsive devices with the true speed and true distance integrating devices, and illustrating a means to provide energy from an outside source to actuate the devices driven by the differential mechanism, instead of having the differential mechanism itself furnish the driving energy;

Fig. 54 is a sectional view on line 54—54 of Fig. 53; and

Fig. 55 is a sectional view on line 55—55 of Fig. 53.

*Mounting,* (Figs. 1–4, inclusive.)

Referring now to the drawings, and to the embodiment of my invention which is illustrated therein, and first more particularly to Figs. 1 to 4, inclusive, I have shown a speedometer having a mounting comprising a base or support 61, provided with a pair of arms or standards 62, on which a gimbal ring 63 is mounted to turn about a horizontal axis $a$—$a$, which may be at right angles to the fore and aft center line of the craft. This ring, in turn, carries a casing 64, which is pivoted to said ring to swing about a horizontal axis $b$—$b$, which may be parallel or coincident with the fore and aft center line of the craft. The casing 64 may be provided with a cover 65, having a glazing 66, through which the true speed, true distance and true direction integration devices may be viewed. The center of gravity of the mass of the casing 64, and the mechanism which it contains is below the axes $a$—$a$ and $b$—$b$, and hence the casing tends to remain horizontal, despite any inclination of the craft on which it is mounted, when the craft is at rest or traveling at a uniform speed. When the craft is being accelerated or retarded, the swinging tendency of the whole instrument as a pendulum on its mounting is overcome by the movement of the acceleration and retardation carriages hereinafter described. Swinging tendencies of the whole instrument as a pendulum due to centrifugal force are overcome by the movement of the centrifugal force correcting carriage hereinafter described. These balancing actions, however, are assisted by a gyroscope, as will presently appear.

*Inclination indicating means,* (Figs. 1–4, inclusive.)

If desired, the instrument may be provided with suitable means for indicating the lateral and fore and aft inclinations of the craft, and in the present example, I have shown two sets of inclination indicating devices, which I will now describe. Secured to one of the arms 62 is a fixed hand or pointer 67, coöperating with a suitably graduated scale 68, which may be a ring or sector secured to the gimbal ring 63, as best shown in Fig. 3. The axis of the scale 68 is coincident with the axis $a$—$a$, and hence any change of fore and aft inclination of the craft will cause the hand or pointer 67 to move with reference to the scale, and will indicate in degrees or other suitable units the amount of inclination. The lateral inclination indicating device comprises a similar hand or pointer 69 and graduated scale 70, whose axis is coincident with the axis $b$—$b$, the hand or pointer being secured to the gimbal ring, and the scale to the instrument casing. Thus it is evident that any lateral inclination of the craft will be shown by corresponding movement of the hand or pointer 69 over the scale 70, thus enabling the amount of lateral inclination to be read in degrees or other units.

*Gyroscope,* (see Fig. 6.)

As a means for aiding the action of gravity in keeping the instrument level or horizontal, as well as to provide a source of power for certain devices hereinafter described, I have provided a gyroscope mechanism comprising a motor 71, which may be of any suitable type, either electrical or otherwise, having a shaft 72, which through suitable means, herein a bevel pinion 73 and bevel gear 74, drives a vertical shaft 75, whose axis $c$—$c$ is the same as that of the entire instrument, and passes through the point of intersection of the axes $a$—$a$ and $b$—$b$, perpendicular to a horizontal plane containing the axes $a$—$a$ and $b$—$b$. This shaft may be supported in any suitable anti-friction bearings 76 and 77 in the casing 64. Secured to the upper end of this shaft is a gyroscope fly wheel 78, which will be rotated at high speed by the motor 71. Any suitable means may be provided to maintain the speed of the fly wheel 78 uniform within very small limits. In the present example, I have for this purpose shown a governor comprising the shaft 79 mounted in bearings 80 and 81 and carrying suitable governor weights 82 which may be secured to any suitable means, herein springs 83, the latter in turn being secured to upper and lower collars 84 and 85 mounted on shaft 79. The upper collar is mounted in fixed position, while the lower collar is mounted to slide vertically on the shaft, and may operate through any appropriate means to control the speed of the motor 71. In the present instance, I have shown for this purpose carried by the vertically sliding collar 85 a brake disk 86 coöperating with a brake shoe 87, which may be adjustably mounted, thereby to permit the action of the governor to be varied within reasonable limits. In the present example, I have provided for this purpose a bell crank lever 88 which carries the brake shoe 87 and is fulcrumed on a pivot 89. An adjusting screw 90 threaded into the casing 64 is suitably connected to the bell crank lever to adjust the latter, as, for example, by providing said screw with an annular groove 61 to receive one arm of the lever. A lock nut 92 may be provided to secure the adjusting screw in the desired position of adjustment. The governor shaft 79 may be driven by any suitable means, such, for example, as a gear 93 secured to the shaft 75 and meshing with a gear 94 secured to the governor shaft 79.

*Fore and aft responsive means,* (Figs. 10, 11 and 12.)

I have herein provided means to indicate the velocity by utilizing the variations of inertia forces of a mass in accordance with the variations in the velocity of the craft or vehicle which carries the instrument. This mass may take various forms, but in the present example I have shown a pendulum 95, which is mounted to swing freely in a vertical plane parallel with the fore and aft center line of the craft or vehicle. In the specific embodiment selected for illustration, the pendulum is made up of a comparatively thin light arm having a bob in the form of a weight or pair of weights 96 secured thereto in any appropriate manner, as by means of a screw or bolt 97.

The pendulum may be otherwise suitably mounted, but in the present example is provided with a pair of knife-edge pivots 98, herein formed on yokes 99 suitably secured to the sides of the pendulum, said pivots resting in grooves 100 on a suitable support. In the present example, such support is in the form of a pair of fore and aft bars 101, the latter being supported at their ends on and rigidly secured to transverse bars 102, forming a part of the frame-work of the instrument. The latter bars may be suitably supported, as by means of lugs or brackets 103 projecting inwardly from the casing 64, as best shown in Fig. 10. As a means for preventing upward displacement of the pendulum, I have herein provided the yokes 99 with laterally projecting lugs 104 which extend beneath the supporting bars 101, as best shown in Fig. 12. Sufficient clearance is provided to allow the pendulum to swing freely while still restricting its upward movement.

The arm of the pendulum 95 is extended to a considerable width in the plane of its oscillation, and intermediate its points of support it has a straight edge or surface 105, which is horizontal when the pendulum is in equilibrium, which condition obtains when the craft or vehicle is at rest or traveling at a uniform speed.

Now, it must be evident that the described pendulum is responsive to fore-and-aft acceleration and retardation, so that on the one hand when the craft or vehicle starts in a forward direction from a state of rest or in already in motion, and its speed is accelerated, the pendulum will tend to lag behind, and when on the other hand its motion is retarded, the pendulum will tend to swing in a forward direction, under the influence of the inertia forces set up in a horizontal direction. This tendency may be utilized either directly or indirectly in any appropriate manner and by any appropriate means to operate a suitable fore-and-aft acceleration and retardation integrating device to give fore-and-aft speed. In the present example I have provided suitable means which receives the impulse from the pendulum and transmits or relays this impulse to the integrating device. Such means may include an electric circuit of which the pendulum constitutes the making and breaking device, the pendulum for this purpose being herein provided with a pair of suitable contacts 106 which coöperate with and are adapted to make and break contact with a pair of stationary contacts 107, the latter being herein mounted on adjusting screws 108 and supported on the bars 101, from which said contacts are insulated by appropriate insulating means, herein in the form of a pair of insulating blocks 109. Because of the gimbal mounting of the instrument casing, equal gaps are normally maintained between the pairs of contacts 106 and 107 when the pendulum 95 is in equilibrium.

Connected with the stationary contacts 107 are two conducting wires 110, which may lead to any suitable means adapted to receive the electrical impulse and to transmit the same to the integrating device. In the present example, these wires are connected to two solenoids 111, best shown in Figs. 47 and 48. These solenoids may be and are herein co-axially alined and are inclosed in suitable casings 112, which are mounted on supporting bars 113 and 114, the latter in turn being secured to the bars 102. The solenoids 111 are herein provided with a common core 115, which may be mounted to slide in suitable non-magnetic tubular guides 116 within the respective solenoids, as best shown in Figs. 47 and 48. It must now be evident that when the pendulum swings in one direction, the circuit will be completed to one solenoid, thereby to energize the latter and to move the core in one direction, while on the other hand when the pendulum swings in the opposite direction, the other solenoid will be energized and the core moved in the opposite direction.

The core 115 may impart its motion through any suitable mechanism. In the present example, I have shown secured to the core a rack 117 meshing with a pinion 118 and adapted to rotate the latter in one direction or the other, as the case may be, according to which of the solenoids 111 is energized. The core 115 may be held against turning movement in any appropriate manner, as by extending the rack 117 to form keys 119 mounted to slide in keyways 120 formed in the tubular guides 116 respectively, as best shown in Fig. 47. The pinion 118 is herein secured to a shaft 121 having its upper and lower ends mounted in suitable bearings 122 and 123 in the bars 113 and 114 respectively, as best shown in Fig. 48.

Also secured to the shaft 121 is a gear 124, the latter meshing with an intermediate gear 125 best shown in Fig. 6. This gear is herein mounted to turn on a stud 126 on a supporting bar 127, best shown in Figs. 6, 8 and 10, having its ends secured to the bars 102 hereinbefore described.

The intermediate gear 125 in turn meshes with a rack 128, best shown in Fig. 22, forming a part of a carriage shown in detail in Figs. 22 to 25 inclusive and having a frame 129 to which said rack is secured. This frame is herein mounted for fore-and-aft movement and to that end is provided with a plurality of anti-friction rollers including a roller 130 on one side of the carriage and two pairs of rollers 131 and 132 on the other side. Preferably these rollers are so placed as to form a three-point support for the carriage, as best shown in Fig. 10. The roller 130 is arranged to travel on a guide 133 which may be and herein is formed as a part of the bar 114 hereinbefore described, while the rollers 131 and 132 are mounted to travel on a guide 134, best shown in Fig. 10, having its ends secured to the bars 102 hereinbefore described. The carriage frame is moved back and forth on these supporting bars or guides under the influence of one solenoid or the other consequent on the closing of one or the other of the two electric circuits by the oscillation of the pendulum in one direction or the other. If desired, an additional anti-friction guide roller 135, mounted on the rack 128 (see Fig. 22), may be arranged to bear against the under side of the bar 127, as best shown in Fig. 6, thereby to prevent the carriage from lifting from its lower guides 133 and 134.

It must now be evident that the carriage moves to and fro under the intermittent impulses imparted to it through the swinging motion of the pendulum. It must also be evident that the carriage should move with each impulse a distance proportional to the acceleration or retardation which caused the impulse and that when the carriage reaches the proper point the pendulum should be restored to equilibrium thereby to break the previously completed circuit. To these ends, I may provide any suitable means carried by the carriage as, for example, a spring 136, best shown in Figs. 10 and 11, secured to an arm 137 on the carriage frame 129 and resting on the upper straight edge 105 of the pendulum 95. When the latter is in equilibrium, as shown in Fig. 11, the free end of the spring 136 rests centrally upon the pendulum in line with its fulcrum. When, however, the carriage which carries the spring moves in one direction or the other under the impulse which is imparted to it by the oscillation of the pendulum, the spring is moved from its central position in one direction or the other, as the case may be, along the surface 105. When this occurs, the spring naturally presents an opposing force proportional to its distance from the fulcrum and this force is sufficient to restore the pendulum to equilibrium, thus breaking the circuit and leaving the carriage in the position to which it was brought by the impulse which it received. It should here be noted that the spring 136, in its practical effect, is the equivalent of a weight.

Figure 7:
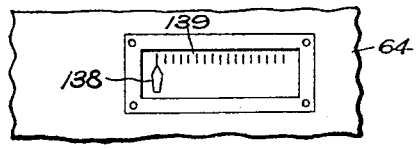
Fig. 7 is a detail elevation of the fore and aft acceleration and retardation indicator, as viewed from the right-hand side of Fig. 6.

As a means for indicating the fore-and-aft acceleration and retardation, I have herein provided an acceleration and retardation indicator comprising a pointer 138, best shown in Figs. 6 and 7, carried by the carriage and coöperating with a suitably graduated scale 139, the latter in the present example being in the form of a window mounted in one side of the casing 64 and provided with suitable graduations conventionally shown in Fig. 7.

Associated with the carriage frame 129 and forming a part of the carriage is a differential mechanism comprising a differential frame 140 which is carried to and fro by the carriage frame but is preferably connected thereto in such a manner as to be capable of moving freely in a vertical direction. To this end, the two frames are herein connected by a link 141, best shown in Figs. 22 and 23, pivotally connected at its opposite ends to the respective frames. In the present example this link, as best shown in Fig. 22, is in the form of the letter H. Suitably mounted on the differential frame 140 are two friction rollers 142 and 143, best shown in Figs. 22 to 25 inclusive, secured to shafts 144 and 145 respectively, the latter being journaled in suitable bearings in the differential frame 140. These friction rollers rest upon and are driven by a friction disk 146 which may be driven by any suitable source of power but in the present example as best shown in Fig. 6, is secured to and driven by the gyroscope fly wheel 78. The friction rollers 142 and 143 are preferably of equal diameter and should at all times contact with the friction disk 146 on that diameter of the latter which is parallel with the motion of the carriage. The link 141 permits the friction rollers always to maintain equal driving contact with the disk 146 regardless of any possible inaccuracies in the carriage guiding means and in the disk itself. The use of the link also enables the weight of the differential frame and the parts which it carries to produce sufficient force to cause the disk to drive the rollers at all times. It is evident that this weight may be as great as needed and that it is the full mechanical equivalent of a spring.

The friction rollers 142 and 143 may be, and in the present example are, placed on opposite sides of the axis of the friction disk 146, although this arrangement is not essential. When so placed, they are preferably located at equal distances from the axis of the disk when the craft or vehicle is at rest, and this is the position in which they are shown in the drawings.

The shafts 144 and 145 are connected by differential gearing whose object is to obtain a rotation proportional to one-half the algebraic sum of the rotations of the friction rollers 142 and 143 at all positions of the latter with respect to the disk 146 when the carriage is moved to and fro. To this end, I have provided differential gearing including two pinions 147 and 148 secured to the shafts 144 and 145 respectively, as best shown in Fig. 24. These pinions mesh respectively with pairs of intermediate pinions 149 and 150 and the pinions of each of these pairs mesh with each other as best shown in Figs. 26, 27 and 28. The intermediate pinions are journaled on and carried by a suitable rotatable support, herein a differential cage comprising two disks 151 and 152 mounted loosely on the hubs of the pinions 147 and 148 respectively and secured to each other by a plurality of rods 153. The described friction rollers and differential gearing may be likened to the ordinary and well-known rear axle of a motor vehicle, the principle involved and the mode of operation being the same except that in the present case the wheels, instead of being driven by the differential gearing, are driven by the friction disk and serve to impart to the differential cage a rate of rotation which is one-half the algebraic sum of the rotations of the two friction wheels.

Figures 8, 9:
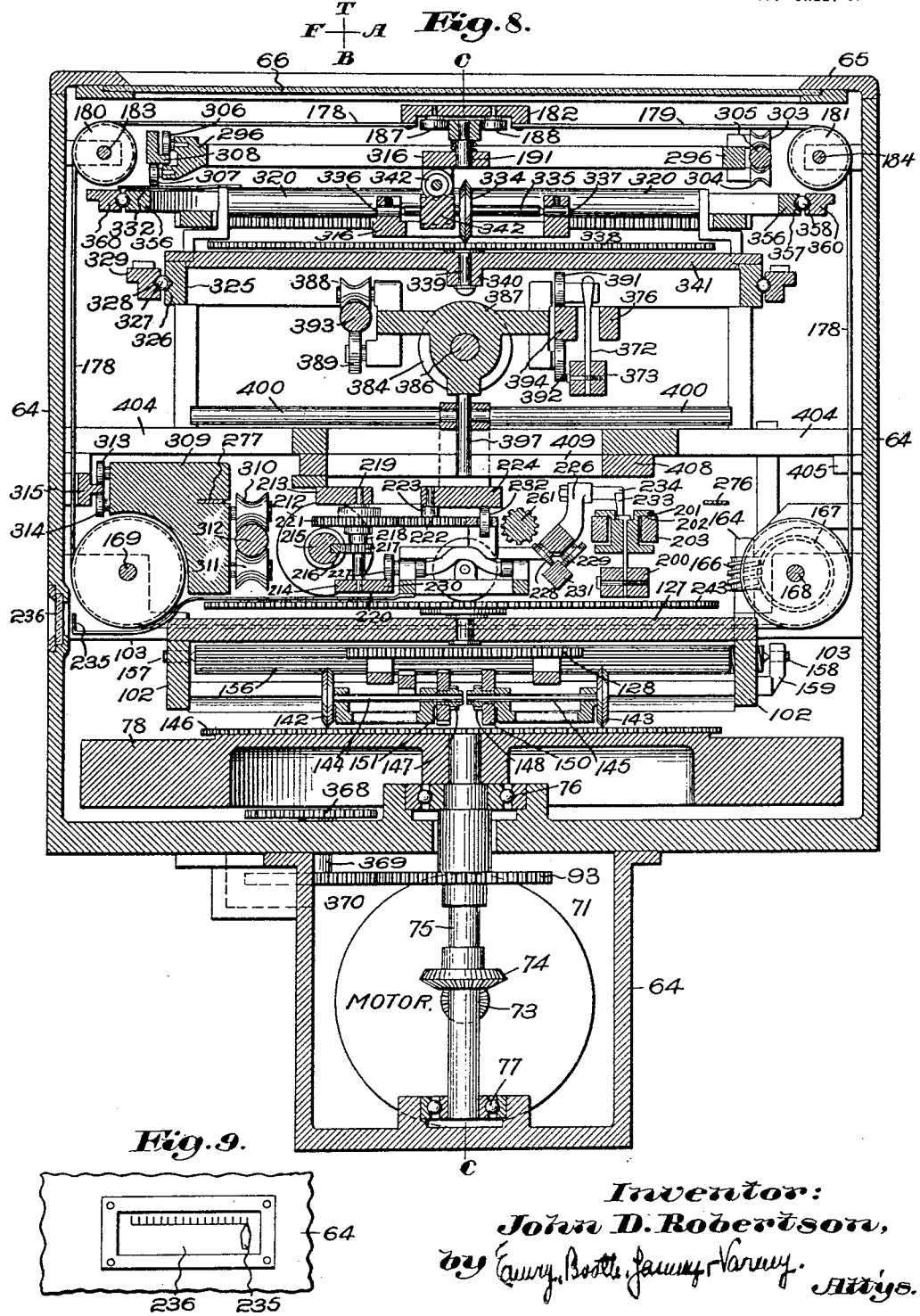
Fig. 8 is a sectional view on line 8—8 of Fig. 1, looking toward the right.
Fig. 9 is a detail elevation of the lateral acceleration and retardation indicator, as viewed from the left-hand side of Fig. 8.

Formed on or secured to the disk 151 is a gear 154 best shown in Figs. 22, 23 and 24, which meshes with an intermediate gear 155, while the latter in turn meshes with a pinion rod 156, best shown in Figs. 8 and 10. The length of this pinion rod is such that the intermediate gear 155 remains constantly meshed therewith throughout the full travel of the carriage. The pinion rod 156 is herein mounted in suitable bearings 157 and 158 supported on the bars 102, the bearing 157 being directly supported in one bar while the bearing 158 is mounted in a bracket 159 secured to the other bar as shown in Figs. 8 and 10.

Formed on or secured to the pinion rod 156 is a worm 160 which meshes with a worm gear 161, best shown in Fig. 52. This worm gear is formed on or secured to a vertical shaft 163 which is mounted in bearings 164 and 165, while a second worm 166, formed on or secured to the shaft, meshes with another worm gear 167. The latter is formed on or secured to a horizontal shaft 168, mounted in suitable bearings in the lugs or brackets 103, hereinbefore described, as best shown in Fig. 10.

Figure 41:
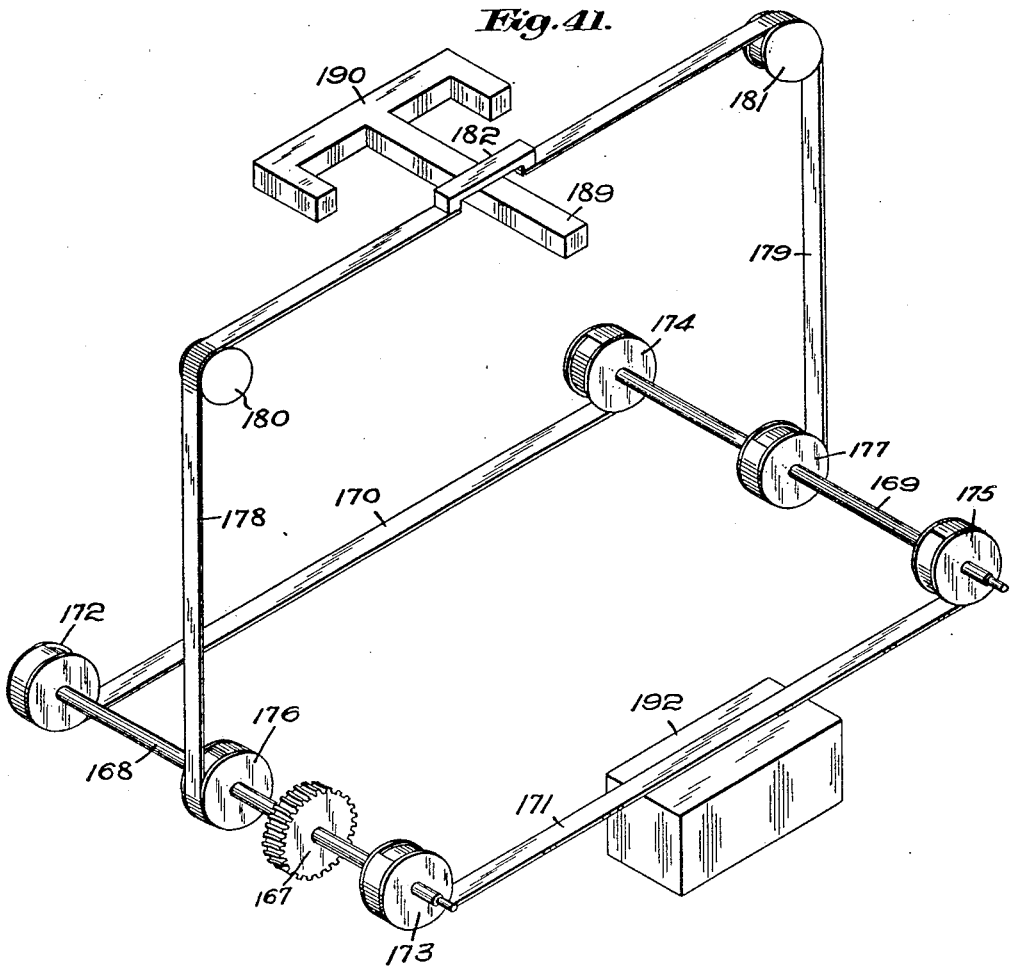
Fig. 41 is a skeletonized, perspective view of a portion of the mechanism which connects the fore and aft acceleration and retardation responsive device with the true speed integrating device.

Arranged oppositely with relation to the shaft 168 and parallel therewith, is a second shaft 169 mounted in suitable bearings in the other pair of lugs or brackets 103, as best shown in Fig. 10. These shafts are connected to each other by a pair of flexible bands 170 and 171, whose terminal portions are secured to and wrapped about suitable pulleys 172, 173, 174 and 175 secured to the shafts 168 and 169, as best shown in Fig. 41. Also secured to these shafts are two other pulleys 176 and 177, located preferably in the middle of said shafts. Secured to and wrapped about these pulleys are terminal portions of two flexible bands 178 and 179 which lead in an upward direction therefrom to and part way about idle pulleys 180 and 181, respectively, and thence inwardly toward each other. The remaining terminal portions of the bands are herein connected to each other by an intermediate connecting block or yoke 182, to which they are secured. The described arrangement constitutes in effect a species of endless driving belt connecting the worm gear 167 with the yoke 182, and serving to move the latter to and fro in a fore-and-aft direction. It must now be evident that the yoke 182 moves fore and aft in response to variations in fore and aft speed of the craft or vehicle and in definite ratio to such variations, and hence can be utilized to give fore and aft speed. Any suitable means may be provided to enable this speed to be read. To this end, if desired, the yoke 182 may carry a suitable index or pointer P to coöperate with a suitably graduated scale S on the glass 66. The pulleys 180 and 181 are herein mounted to turn on suitable studs 183 and 184 on lugs or brackets 185 and 186 projecting inwardly from the casing 64, as best shown in Figs. 8 and 18.

Carried by and journaled to rotate on the yoke 182 are two rollers 187 and 188, best shown in Fig. 8, which embrace an arm 189 of a generally T-shaped carriage 190, best shown in Figs. 18 and 41, said arm extending at right angles to the fore and aft center line and said carriage being mounted as hereinafter described for movement fore and aft in a path parallel with said center line. Carried by and depending from the arm 189 of the carriage 190, is a pin 191 whose vertical axis normally coincides with the vertical axis $c$, $c$, of the instrument, as shown for example in Figs. 8 and 18. When the carriage 190 is moved in a fore and aft direction under the influence of the yoke 182, the depending pin 191 is carried forward and backward thereby. The carriage 190, as will later appear, has a transverse movement and hence the pin 191 will partake of both movements and will have a compound movement, as more fully described hereinafter.

As a means for counter-balancing, with respect to a transverse axis, the weight of the carriages 190 and 296 and the compounding mechanism, the latter shown in Figs. 36 to 40 inclusive, which it will be remembered travels in and out from the center, I have herein provided a counter-weight 192 secured to the flexible band 171, as shown in Figs. 6, 10 and 41. This counter-weight may be supported and guided to move parallel with the fore and aft center line, by any suitable means. In the present example, it is provided at one side with a pair of guide rollers 193 and 194 above and below a guide 195, and at its opposite side it is provided with two pairs of upper and lower guide rollers 196 and 197 which may be and are herein grooved, and travel on a cylindrical guide 198. Preferably these rollers are so placed as to form a three-point support for the carriage. The guide 195 may be and herein is formed as a part of the bar 101 hereinbefore described, which it will be remembered is supported on the bars 102, while the guide 198 is supported by the lugs or brackets 103, as best shown in Fig. 10. It will be understood that the arrangement is such that when the carriage moves in one direction the counter-weight moves in the opposite direction and thus compensates for any tendency to destroy the balance of the instrument, it being understood, of course, that the mass of the various parts is calculated to secure this result.

Figure 13:
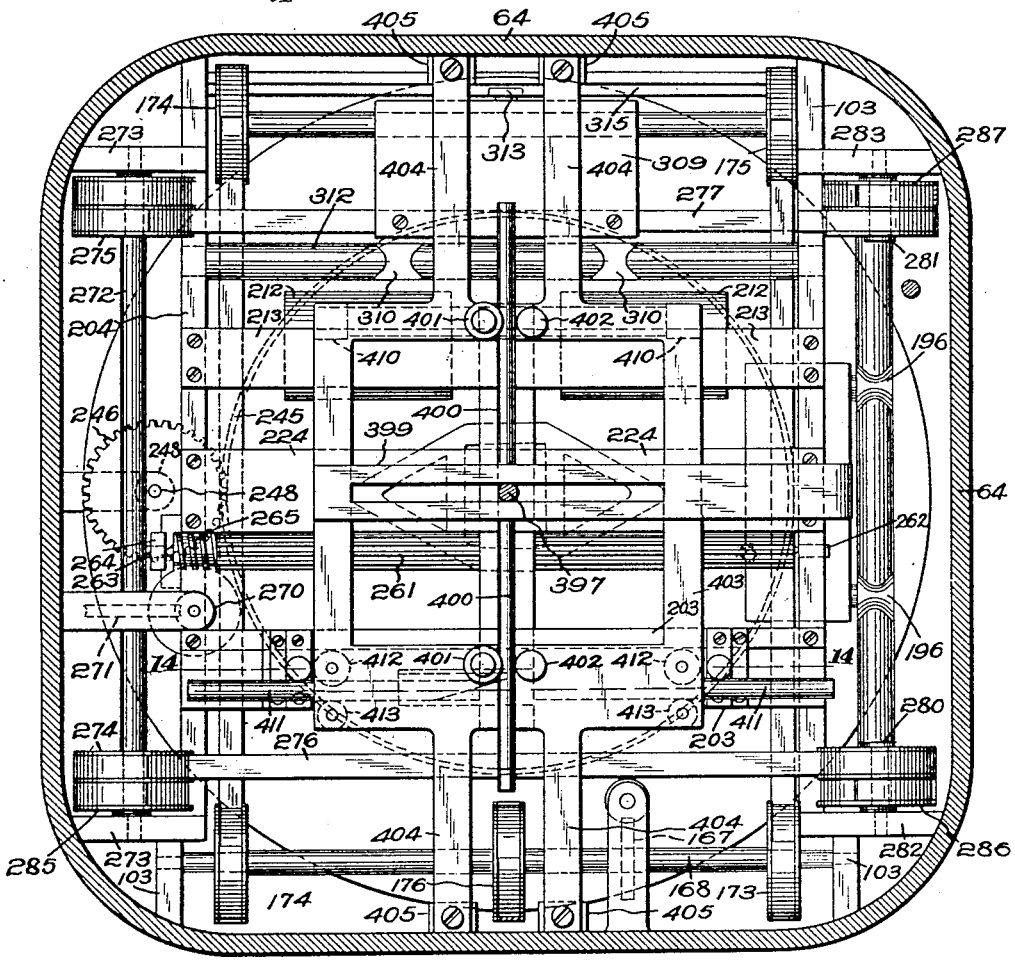
Fig. 13 is a plan section on line 13—13 of Fig. 6.
Figure 14:
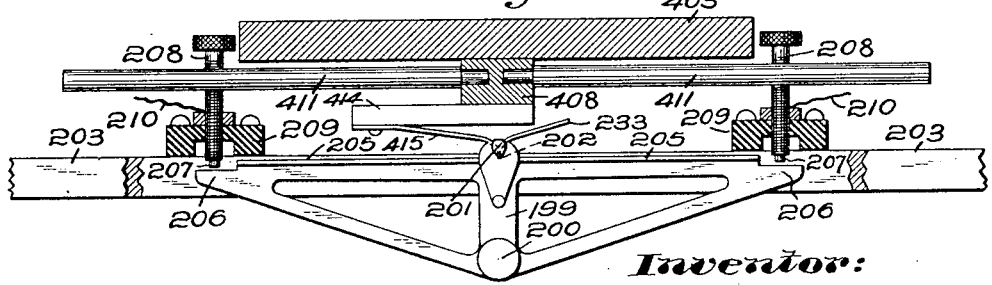
Fig. 14 is a detail, sectional view on line 14—14 of Fig. 13, showing the lateral acceleration and retardation responsive means comprising a pendulum, and showing also the correcting devices for the same.

*Lateral responsive means* (Figs. 13 and 14).

In connection with water and air craft, it is essential that side drift should be taken into consideration in ascertaining the true speed and true distance traveled as well as the true direction of travel. One of the components of these results is furnished by the fore-and-aft means hereinbefore described. The other is furnished by the lateral responsive means which I will now describe. It is here to be noted that there should also be considered the effect of centrifugal force when the craft is traveling in a curved path to the right or to the left. This effect is taken care of by a third responsive means which will be described still later.

Referring now to Figs. 13 and 14, I have shown a lateral responsive device which may be and is herein similar to the fore-and-aft responsive device hereinbefore described, the same comprising a pendulum 199 provided with a weight or bob 200 and mounted to oscillate on knife-edge pivots 201 resting in grooves 202 in each of a pair of transverse supporting bars 203, the latter being supported at their ends on fore- and-aft bars 204 which, in turn, are mounted on the lugs or brackets 103, as best shown in Fig. 13, hereinbefore described.

The pendulum 199, like the pendulum 95 hereinbefore described, is extended laterally in both directions from its pivotal point, and is provided with a normally horizontal straight edge or surface 205, as shown in Fig. 14. Likewise, the pendulum 199 is provided with contacts 206 coöperating with contacts 207, the latter being mounted on adjustable screws 208 whereby the gaps between said contacts may be adjusted at will. These adjusting screws, like those first described, are preferably mounted on insulating blocks 209 which insulate them from the supporting bars 203.

Connected to the screws 208 are conducting wires 210 which, in turn, are respectively connected to solenoids 211, the latter being mounted in casings 212, best shown in Figs. 8 and 13. These casings are herein secured to supporting bars 213 and 214 which extend transversely of the instrument and are supported at their ends by fore-and-aft supporting bars 204, hereinbefore described.

Mounted to slide axially in the solenoids 211 is a core 215 which receives an impulse in one direction or the other through the completion of one circuit or the other by the closing of one set of contacts shown in Fig. 14. The core 215 may impart its motion through any suitable mechanism. In the present example, I have shown for this purpose a mechanism which is substantially similar to that which has already been described in connection with the fore-and-aft responsive mechanism. Secured to and carried by the core 215 is a rack 216 which meshes with a pinion 217 best shown in Fig. 8. This pinion is formed on or secured to a vertical shaft 218, the latter being mounted in suitable bearings 219 and 220 in the bars 213 and 214, respectively. Also formed on or secured to the shaft 218 is a gear 221 meshing with an intermediate gear 222, the latter being mounted to turn on a stud 223 on a supporting bear 224 which, as best shown in Fig. 6, is supported at its ends on the bars 204 hereinbefore described.

Meshing with the intermediate gear 222 is a rack 225, best shown in Figs. 29 and 30, forming a part of a carriage, shown in detail in Figs. 29 to 35, inclusive, and having a frame 226 to which said rack is secured. This frame is herein mounted for transverse movement and to that end is provided with a plurality of anti-friction rollers including a roller 227 on one side of the carriage and two pairs of rollers 228 and 229 on the other side. Preferably these rollers are so placed as to form a three-point support for the carriage as best shown in Fig. 13. The roller 227 is arranged to travel on a guide 230 which may be and herein is formed as a part of the bar 214 hereinbefore described, while the rollers 228 and 229 are mounted to travel on a guide 231, best shown in Fig. 13, having its ends secured to the bars 204 hereinbefore described.

The carriage frame is moved to and fro on these supporting bars or guides under the influence of one solenoid or the other consequent on the closing of one or the other of the two electric circuits by the oscillation of the pendulum 199 in one direction or the other. If desired, an additional anti-friction guide roller 232 mounted on the rack 225 (see Fig. 29) may be arranged to bear against the under side of the bar 224, as best shown in Fig. 8, thereby to prevent the carriage from lifting from its lower guides 230 and 231.

It must now be evident that the carriage moves to and fro in a transverse direction under the intermittent impulses imparted to it through the swinging motion of the pendulum 199. It must also be evident that the carriage should move with each impulse a distance proportional to the acceleration or retardation which caused the impulse and that when the carriage reaches the proper point the pendulum should be restored to equilibrium thereby to break the previously completed circuit. To these ends, I may provide any suitable means carried by the carriage, as for example, a spring 233, best shown in Figs. 8 and 13, secured to an arm 234 on the carriage frame 226 and resting on the upper straight edge 205 of the pendulum 199. When the latter is in equilibrium, as shown in Fig. 14, the free end of the spring 233 rests centrally upon the pendulum in line with its fulcrum. When, however, the carriage which carries the spring moves in one direction or the other under the impulse which is imparted to it by the oscillation of the pendulum, the spring is moved from its central position in one direction or the other, as the case may be, along the surface 205. When this occurs, the spring naturally presents an opposing force proportional to its distance from the fulcrum and this force is sufficient to restore the pendulum to equilibrium, thus breaking the circuit and leaving the carriage in the position to which it was brought by the impulse which it received. It should here be noted that the spring 233, in its practical effect, is the equivalent of a weight.

As a means for indicating the transverse acceleration and retardation, I have herein provided an indicator comprising a pointer 235, best shown in Figs. 8 and 9, carried by the carriage and coöperating with a suitably graduated scale 236, the latter, in the present example, being in the form of a window in one side of the casing 64 and provided with suitable graduations conventionally shown in Fig. 9.

Associated with the carriage frame 226 and forming a part of the carriage is a differential mechanism comprising a differential frame 237 which is carried to and fro by the carriage frame but is preferably connected thereto in such a manner as to be capable of moving freely in a vertical direction. To this end, the two frames are herein connected by a link 238, best shown in Figs. 29 and 30, pivotally connected at its opposite ends to the respective frames. In the present example, this link, as best shown in Fig. 29, is in the form of the letter H. Suitably mounted on the differential frame 237 are two friction rollers 239 and 240, best shown in Figs. 29 to 32 inclusive, secured to shafts 241 and 242 respectively, the latter being journaled in suitable bearings in the differential frame 237. These friction rollers rest upon and are driven by a friction disk 243 which may be driven by any suitable source of power. In the present example, as best shown in Fig. 6, the disk is mounted to turn on a stud 244 on the supporting bar 127. Suitably formed on or secured to the disk 243, and in the present example cut in the periphery of the latter, is a gear 245 meshing with and driven by a pinion 246. The latter is secured to a vertical shaft 247 mounted in suitable bearings 248 and 249 and carries at its lower end a second pinion 150 which meshes with a gear 251 which may be and is herein formed on the periphery of the friction disk 146 hereinbefore described.

The friction rollers 239 and 240 are preferably of equal diameter and should at all times contact with the friction disk 243 on that diameter of the latter which is parallel with the motion of the carriage. The link 238 permits the friction rollers always to maintain equal driving contact with the disk 243 regardless of any possible inaccuracies in the carriage guiding means and in the disk itself. The use of the link also enables the weight of the differential frame and the parts which it carries to produce sufficient force to cause the disk to drive the rollers at all times. It is evident that this weight may be as great as needed and that it is the full mechanical equivalent of a spring.

The friction rollers 239 and 240 may be, and in the present example are, placed on opposite sides of the axis of the friction disk 243, although this arrangement is not essential. When so placed, they are preferably located at equal distances from the axis of the disk when the craft or vehicle is at rest, and this is the position in which they are shown in the drawings.

The shafts 241 and 242 are connected by differential gearing whose object is to obtain a rotation proportional to one-half the algebraic sum of the rotations of the friction rollers 239 and 240 at all positions of the latter with respect to the disk 243 when the carriage is moved to and fro. To this end, I have provided differential gearing including two pinions 252 and 253 secured to the shafts 241 and 242, respectively, as best shown in Fig. 31. These pinions mesh, respectively, with pairs of intermediate pinions 254 and 255 and the pinions of each of these pairs mesh with each other, as best shown in Figs. 33, 34 and 35. The intermediate pinions are journaled on and carried by a suitable rotatable support, herein a differential cage comprising two disks 256 and 257 loosely mounted on the hubs of the pinions 252 and 253 respectively and secured to each other by a plurality of rods 258.

Formed on or secured to the disk 256 is a gear 259, best shown in Figs. 29, 30 and 31, which meshes with an intermediate gear 260, while the latter in turn meshes with a pinion rod 261, best shown in Figs. 8 and 13. The length of this pinion rod is such that the intermediate gear 260 remains constantly meshed therewith throughout the full travel of the carriage. The pinion rod 261 is herein mounted in suitable bearings 262 and 263 supported by the bars 204, the bearing 262 being indirectly supported by one bar while the bearing 263 is mounted in a bracket 264 secured to the other bar, as shown in Figs. 13 and 49.

Formed on or secured to the pinion rod 261 is a worm 265 which meshes with a worm gear 266, best shown in Fig. 50. This worm gear is formed on or secured to a vertical shaft 267 which is mounted in bearings 268 and 269, while a second worm 270, formed on or secured to the shaft, meshes with another worm gear 271. The latter is formed on or secured to a horizontal shaft 272 mounted in suitable bearings in lugs or brackets 273, best shown in Fig. 13.

Figure 42:
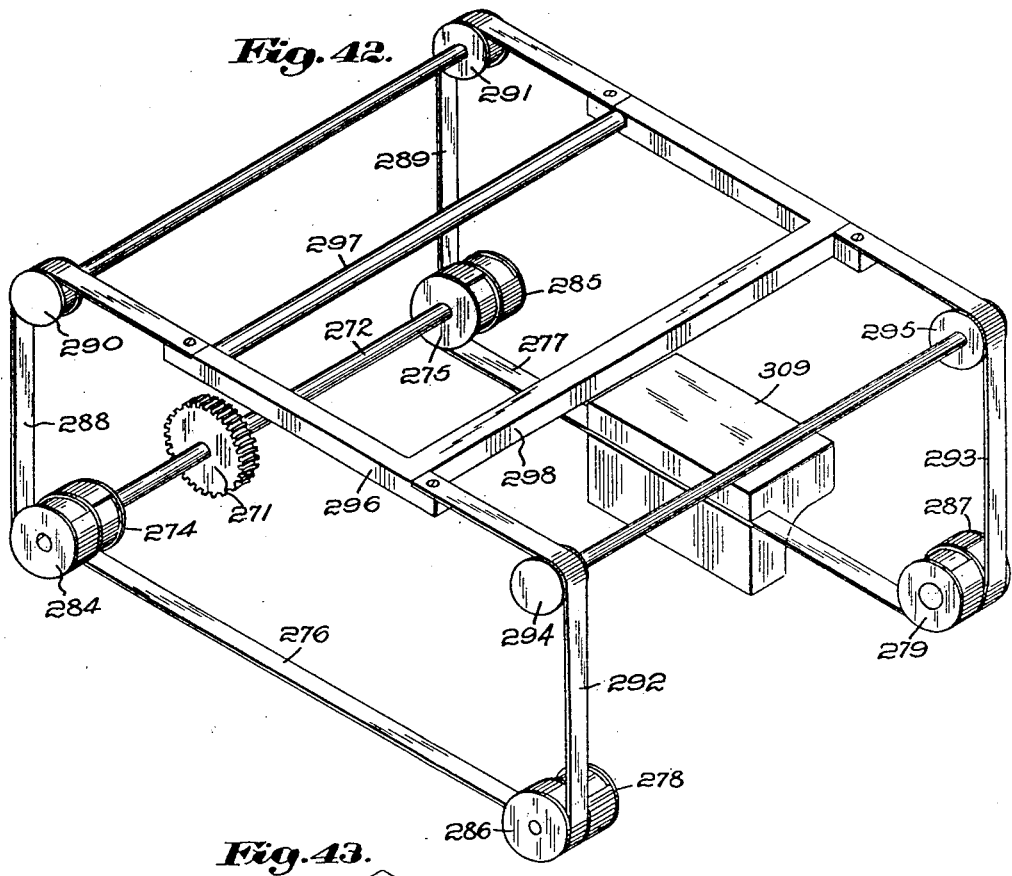
Fig. 42 is a skeletonized, perspective view, similar to Fig. 41, showing a portion of the mechanism which connects the lateral acceleration and retardation responsive device with the true speed integrating device.

Secured to the shaft 272 are two pulleys 274 and 275, best shown in Figs. 13 and 42. Secured to and wrapped about these pulleys are terminal portions of a pair of flexible bands 276 and 277, whose other terminal portions are secured to and wrapped about two pulleys 278 and 279, respectively. These pulleys are mounted to rotate on studs 280 and 281, secured to lugs or brackets 282 and 283 projecting inwardly from the casing 64, as best shown in Fig. 13.

Also secured to the shaft 272 are two pulleys 284 and 285, located preferably at the outer ends of said shaft, and secured to pulleys 278 and 279 are pulleys 286 and 287, which likewise are mounted to turn on the studs 280 and 281 in line with the pulleys 284 and 285 respectively. Secured to and wrapped about the pulleys 284 and 285 are terminal portions of two flexible bands 288 and 289 which lead in an upward direction therefrom to and part way about idle pulleys 290 and 291 respectively, and thence in an inward direction. Likewise secured to and wrapped about the pulleys 286 and 287 respectively, are terminal portions of two flexible bands 292 and 293 which lead in an upward direction therefrom to and part way about idle pulleys 294 and 295 respectively, and thence in an inward direction.

The remaining terminal portions of the bands are herein connected to each other by an intermediate connecting carriage 296, having guide bars 297 and 298 extending fore and aft parallel with the longitudinal center line. The described arrangement constitutes, in effect, a species of endless driving belt connecting the worm gear 271 with the carriage 296 and serving to move the latter in a lateral direction. It must now be evident that the carriage 296 moves laterally in response to variations in lateral speed of the craft or vehicle, and in definite ratio to such variations, and hence can be utilized to indicate lateral speed. Any suitable means may be provided to enable this speed to be read. To this end, if desired, the carriage may carry a suitable index or pointer P' to coöperate with a suitably graduated scale S' on the glass 66.

Reverting now to the T-shaped carriage 190, hereinbefore described, the latter, as best shown in Figs. 6 and 18, is provided with two pairs of rollers 299 and 300 which are preferably grooved and mounted to travel on the guide bar 297 which is preferably cylindrical. Another pair of rollers 301 and 302, also mounted on the carriage 190, is guided by the upper and lower surfaces of the guide bar 298 hereinbefore described. Preferably these rollers are so placed as to form a three-point support for the carriage 190, as best shown in Fig. 18.

The carriage 296, like the carriage 190, is provided with two pairs of guide rollers 303 and 304 which are preferably grooved and are guided by a preferably cylindrical guide bar 305 extending transversely of and secured at its ends to the casing 64. Likewise journaled on the carriage 296, as best shown in Fig. 8, are two rollers 306 and 307, which are guided by upper and lower surfaces of a guide bar 308 which also extends transversly of and is secured at its ends to the casing 64. Thus the carriage 296 is guided to move to and fro in a transverse direction at right angles to the fore and aft center line.

As a means for counter-balancing, with respect to a longitudinal axis, the weight of the carriages 190 and 296 and the compounding mechanism, the latter shown in Figs. 36 to 40 inclusive, which it will be remembered travels in and out from the center, I have herein provided a counter-weight 309 secured to the flexible band 277, as shown in Figs. 8, 13 and 42. This counter-weight may be supported and guided to move in a transverse direction at right angles to the fore and aft center line by any suitable means. In the present example, it is provided at one side with two pairs of guide rollers 310 and 311 which are preferably grooved and are guided by a preferably cylindrical guide bar 312. At the opposite side of the counter-weight is provided a third pair of rollers 313 and 314, guided by the upper and lower surfaces of a transverse guide bar 315 which is secured to the casing 64. Preferably these three pairs of rollers are so placed as to form a three-point support for the counter-weight 309, as best shown in Fig. 13. It will be understood that the arrangement is such that when the carriage moves in one direction the counter-weight moves in the opposite direction and thus compensates for any tendency to destroy the balance of the instrument, it being understood, of course, that the mass of the various parts is calculated to secure this result.

It should be remembered that the carriage 190 has a fore-and-aft movement on the carriage 296 in response to fore-and-aft movements of the fore-and-aft responsive pendulum 95, and that the carriage 296 is moved to and fro laterally in response to lateral movements of the lateral responsive pendulum 199. It should also be remembered that the carriage 190 carries a depending pin 191. It must therefore be evident that the latter will partake of the movements of both carriages and will have a compound movement which is the resultant of both. This compound movement may be utilized to operate any suitable coördinating means, such for example as that which I shall now describe.

*Coördinating means,* (see Figs. 38 to 40 incl.)

The depending pin 191, to which reference has just been made, has a snug working fit in a frame 316 of a carriage shown in detail in Figs. 36 to 40 inclusive, which is provided with a set of guide rollers, herein comprising three grooved rollers 317, 318, 319, which are preferably grooved and are guided by a guide bar 320 which is preferably cylindrical. It should here be noted that the center of gravity of this carriage should lie in the axis of the pin 191 so that the center of gravity of the carriage shall not be displaced by its rotation about said pin. This guide bar serves to guide the carriage radially, and may also serve as a part of a speed indicator whose other part is carried by the carriage. To this end, the latter is herein provided with a pointer 321, best shown in Figs. 6, 18 and 44, which coöperates with a suitably graduated scale 322 on the guide bar. It must now be evident that this speed indicator, whose movement is the resultant of the transverse and fore-and-aft speeds, gives a direct reading of the true speed of the craft or vehicle.

The guide bar 320 is not mounted in fixed position with reference to the vertical axis of the instrument, but is suitably mounted in such a way as to be capable of turning about the latter. To this end, said guide bar is herein secured at its ends to two brackets 323 and 324, best shown in Figs. 8 and 18, which are mounted on a swiveled ring 325 also suitably mounted to turn about the vertical axis $c$, $c$, of the instrument. In the present example, the ring 325 is provided with a ball-race 326 for a set of balls 327, which are interposed between said ball-race and a second ball-race 328, the latter being formed in an outer ring 329. The latter may be mounted in fixed position in the casing 64 in any suitable manner, as by providing the latter with a pair of inwardly projecting lugs or brackets 330 and 331, best shown in Figs. 6 and 15.

Figure 44:
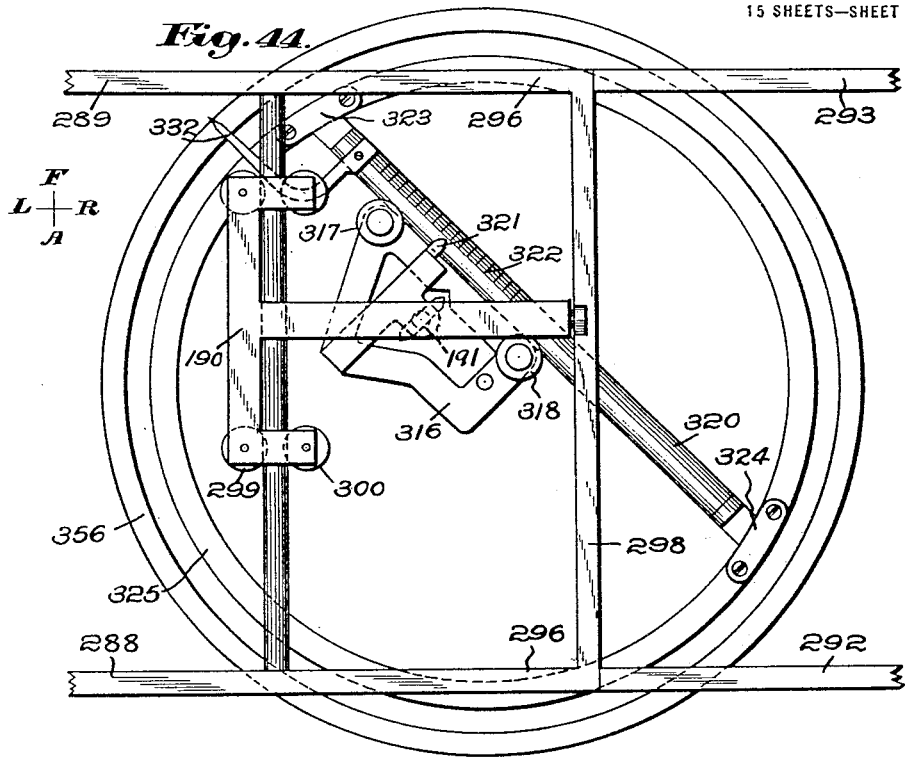
Fig. 44 is a skeletonized plan of a portion of the true speed, true distance and true direction, integrating mechanism, showing the same in one possible position in which the moving body is traveling forward and drifting sidewise.

It should now be observed that the ring 325, which is mounted to turn about the vertical axis $c$, $c$, of the instrument, has secured to it the guide bar 320 which constitutes a guide for the frame 316, and that the latter is moved radially to and fro under the influence of the depending pin 191, see Fig. 44. Remembering that the latter has a fore-and-aft and lateral movement under the influence of the fore-and-aft and lateral responsive devices, it is evident that said pin constitutes a species of crank-pin whose distance from the vertical axis $c$, $c$, of the instrument varies in accordance with the component of the fore-and-aft and lateral speeds. This being so, it is evident that as the pin 191 moves in and out from the axis, and sways to and fro about said axis, it will impart a turning movement to the swiveled ring 325, as will be evident from an inspection of Fig. 44. This turning movement of the ring 325 and guide bar 320 is utilized for two important purposes: one being to operate an indicator to give direct readings of the angle between the true direction and a fixed line which may be the fore-and-aft center line of the moving body, and the other being to provide one of the components of correction for the effect of centrifugal force.

Referring now to the true angle indicating means, I have herein shown, carried by the swiveled ring 325 and mounted on the guide bar 320, a pointer 332, best shown in Figs. 8, 18 and 44, coöperating with a fixed scale 333, best shown in Fig. 18, which may be graduated in degrees or other suitable units of angular distance. By this means, the operator is enabled to see at a glance the true direction in which the craft or vehicle is traveling, as well as the angle between such true direction and the fore-and-aft center line of the craft or vehicle.

I shall now describe the true speed integrating device to give the true distance traveled. Referring to Figs. 36 to 40 inclusive, carried by the carriage frame 316 is a friction wheel 334 which is suitably formed on or secured to a shaft 335, the latter being mounted in bearings 336 and 337 carried by said frame, the axis of said shaft being at all times a radial line intersecting the vertical axis c—c of the instrument. Since the pin 191, hereinbefore described, moves radially along this line, the friction wheel 334 will move correspondingly in a radial direction to and from the vertical axis of the instrument. This in and out movement is utilized to give to the friction wheel 334 varying rates of rotation corresponding with the varying speed of the craft or vehicle.

By driving the friction wheel 334 from a member which has a uniform rate, the friction wheel 334 is driven at a rate of speed proportional to its displacement from the axis c—c of the instrument and thereby is enabled to drive a true distance integrator. To this end, the friction wheel 334 rests upon and is driven by a friction disk 338 which may be connected to and driven by any suitable source of power. The manner of mounting the carriage frame 316 on the cylindrical guide bar 320 enables the friction wheel 334 to be held with suitable driving contact against the upper surface of the friction disk 338. The latter is herein provided with a depending centrally located stud 339 which turns in a bearing 340 in a supporting bar 341, the latter being secured at its opposite ends to the swiveled ring 325, as best shown in Fig. 8.

Referring again to Figs. 36 to 40 inclusive, suitably formed on or secured to the shaft 335 is a spiral gear 342 which meshes with a spiral gear 343 formed on or secured to a shaft 344. Also formed on or secured to this shaft is another spiral gear 345 which meshes with a spiral gear 346 formed on or secured to a shaft 347. The latter may drive any suitable distance registering device, such for example as a common form of counter 348 similar to those used for odometers of vehicles, the same having a set of usual number wheels 349 operating in a well-known manner to register the distance traveled. Thus the counter 348, which constitutes a true distance registering device, is operated by integrating the true speed through the use of the friction disk 338 combined with the compensating device hereinafter described.

I shall now describe the mechanism by means of which the friction disk 338 is driven in such a manner as to compensate for the to and fro swinging movements of the driven friction wheel 334 about the vertical axis c—c of the instrument. In the present example, this is accomplished by the use of a planetary gear set as follows: Formed on or secured to the friction disk 338 is a gear 350 which, as best shown in Fig. 6, meshes with a planet pinion 351. The latter, whose face is of double width, meshes in turn with a second pinion 352 (see Figs. 6, 18, 19, 20 and 21) and this pinion in turn meshes with a third pinion 353 whose face is of double width. These pinions are all suitably mounted on and carried by the swiveled ring 325 and to that end there is herein provided a bracket 354 constituting a mounting for said pinions and secured to said ring, as best shown in Fig. 18.

The pinion 353 meshes with and is driven by an internal gear 355 formed on or secured to a ring 356, the latter being swiveled in any appropriate manner to turn about the upright axis c—c of the instrument. In the present instance, the ring 356 is provided with a ball race 357 for a set of balls 358 which travel in a second ball race 359, the latter being formed in a supporting ring 360. This ring may be suitably supported in fixed position in the casing 64 in any desired manner, but in the present example I have provided two lugs or brackets 361 and 362 projecting inwardly from the casing and constituting supports for said ring, as best shown in Fig. 18.

Also formed on or secured to the swiveled ring 356 is an external spur gear 363 which may be driven at a uniform speed through any suitable mechanism from the source of power. In the present instance, I have shown for this purpose a train of gearing driven by the gear 93 on the main shaft 75. Meshing with the external gear 363 is a pinion 364, best shown in Figs. 6 and 18, and this in turn meshes with and is driven by a pinion 365, the latter being secured to the upper end of a vertical shaft 366 mounted in suitable bearings in the casing 64. To the lower end of this shaft is secured a pinion 367 which meshes with a gear 368 secured to a second vertical shaft 369 journaled in a suitable bearing in the casing 64. Also secured to the shaft 369 is a gear 370 which meshes with an idler gear 371 and the latter in turn meshes with the hereinbefore described gear 93 on the main vertical shaft 75 of the instrument. By this means, the internal gear 355 is driven at a uniform speed at all times.

It must be evident that when the swivel ring 325 moves in a direction opposite to the direction of rotation of the friction disk 338, there would be an increase in the speed of rotation of the friction wheel 334, and on the other hand when the ring 325 moves in the same direction as the friction disk 338, the speed of the friction wheel 334 would diminish were it not for the provision of the planetary gear train just described which constitutes a means to compensate for any such tendency. By this means, the speed of rotation of the friction wheel 334 is maintained constant independently of swinging movements of the friction wheel 334 about the vertical axis $c$ $c$ of the instrument under the influence of side drift of the craft or vehicle.

*Centrifugal force-correcting means,* (Figs. 6, 8, 10, 13, 15, 16, 17, 43 and 45.)

As already intimated, it is essential to provide suitable means responsive to the centrifugal forces set up by movements of the craft or vehicle in a curved path to correct the lateral and fore-and-aft responsive devices. To this end, I have herein provided the centrifugal force-correcting means which I will now describe. Referring now to Figs. 15, 16 and 17, I have therein shown a centrifugal force responsive device similar to the responsive devices hereinbefore described, and comprising a pendulum 372 having a suitable weight 373 and knife edge pivots 374 resting in grooves 375 of a pair of supporting bars 376, the arrangement being such that the pendulum is mounted to oscillate in a plane at right angles to the line of motion. To this end, the supporting bars 376 are secured at their ends to the under side of the swiveled ring 325 as best shown in Fig. 8. The pendulum 372, like those hereinbefore described, is provided with a straight edge 377 which is horizontal when the pendulum is in equilibrium.

The pendulum 372 is provided with contacts 378 coöperating with contacts 379, the latter being mounted on adjustable screws 380 whereby the gaps between said contacts may be adjusted at will. These adjusting screws, like those hereinbefore described, are preferably mounted on insulating blocks 381 which insulate them from the supporting bars 376. It should be understood that in this case also equal gaps between the pairs of contacts are maintained when the pendulum is in equilibrium.

Connected to the screws 380 are conducting wires 382 which lead to solenoids 383, respectively, the latter being mounted in casings 384, best shown in Fig. 6. These casings are herein secured to supporting lugs or brackets 385 carried by the ring 325, so that when the latter swings to and fro about the vertical axis $c$ $c$ of the instrument, the solenoids are carried thereby.

Mounted to slide axially in the solenoids 383 is a core 386 best shown in Fig. 6, which receives an impulse in one direction or the other through the completion of one circuit or the other by the closing of one of the sets of contacts shown in Fig. 16. The core 386 may impart its motion through any suitable mechanism. In the present example, I have shown for this purpose a mechanism which I shall now describe. Secured to and carried by the core 386 is a carriage 387, best shown in Figs. 6 and 15, which, in the present instance, is shaped like the letter T, as viewed in plan. This carriage is suitably mounted on the ring 325 to travel to and fro at right angles to the line of motion under the influence of the solenoids 383. To this end, the carriage is herein provided with two pairs of guide rollers 388 and 389 at one side and a single pair of guide rollers 391 and 392 at the other side, as best shown in Fig. 8. The rollers 388 and 389 may be arranged to travel on a suitable guide bar 393, which may be and is herein cylindrical in form and is secured at its ends to the under side of the ring 325. The rollers 391 and 392 may be guided by suitable means herein a guide 394, the latter, in the present example, being formed as a part of one of the supporting bars 376, hereinbefore described. The arrangement of the rollers is preferably such as to form a three-point support for the carriage as best shown in Fig. 15.

The carriage just described is moved to and fro at right angles to the line of motion under the influence of one solenoid or the other consequent on the closing of one of the two electric circuits by the oscillation of the pendulum 372, in one direction or the other, it being understood, of course, that the movement of the carriage is responsive to the intermittent impulses imparted to it by the solenoids through the completion of the electrical circuits.

It must be evident that the carriage should move with each impulse a distance proportional to the centrifugal force which caused the impulse and that when the carriage reaches the proper point in its travel, the pendulum should be restored to equilibrium, thereby to break the previously completed circuit. To these ends, I may provide any suitable means carried by the carriage, as for example a spring 395, best shown in Figs. 15 and 16 secured to an arm 396 on the carriage 387, and resting on the upper straight edge 377 of the pendulum 372. When the latter is in equilibrium, as shown in Fig. 16, the free end of the spring 395 rests centrally upon the pendulum in line with its fulcrum. When, however, the carriage which carries the spring moves in one direction or the other under the impulse which is imparted thereto by the oscillation of the pendulum, the spring is moved from its central position in one direction or the other, as the case may be, along the surface 377. When this occurs, the spring naturally presents an opposing force proportional to its distance from the fulcrum and this force is sufficient to restore the pendulum to equilibrium, thus breaking the circuit and leaving the carriage in the position to which it was brought by the impulse which it received. It should here be noted that the spring 395, in its practical effect, is the full mechanical equivalent of a weight.

Figure 45:
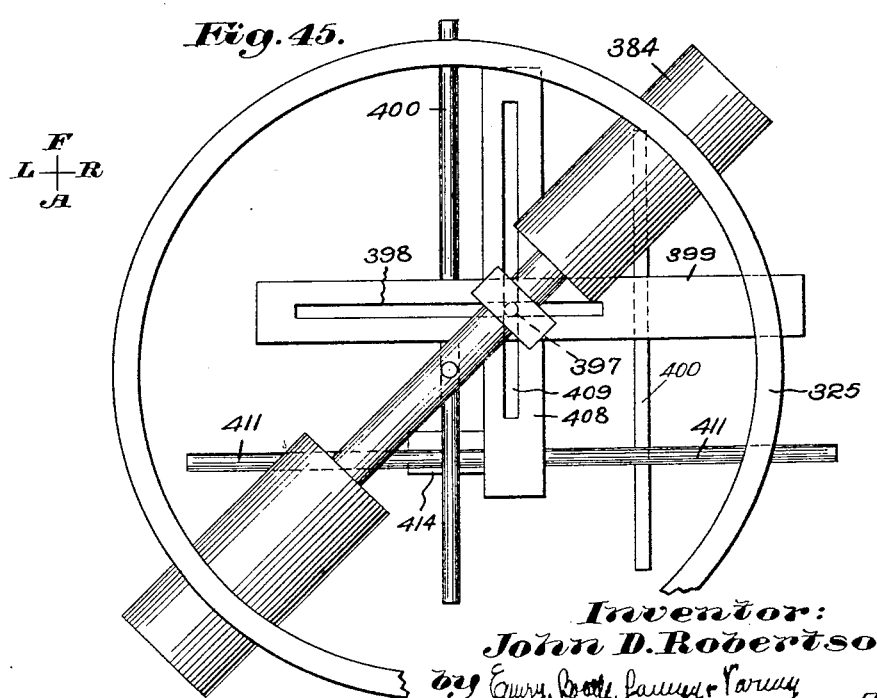
Fig. 45 is a skeletonized plan of a portion of the mechanism which connects the integrating mechanism shown in Fig. 44 with the correcting devices for the fore and aft and lateral acceleration and retardation responsive devices.

Carried by and depending from the carriage 387 is a pin 397, best shown in Figs. 6 and 8, which is located in a slot 398 of a carriage 399, which, as shown in Figs. 13 and 45, is provided with fore-and-aft guide rods 400. These rods may be guided in a fore-and-aft direction by suitable means, such for example as two pairs of guide rollers 401 and 402, best shown in Fig. 13 mounted on a stationary frame 403, the latter having arms 404 secured to lugs 405 projecting inwardly from the casing 64, as best shown in Fig. 13.

By reference to Fig. 45, it will be observed that when one of the solenoids 383 is energized, the pin 397, which is normally centrally located, moves radially in one direction or the other as the case may be according to which of the two solenoids is energized. It should also be observed that when the ring is turned so that the axis of the solenoids and their core is at an angle to the fore-and-aft center line, as exemplified by the position shown in Fig. 45, the pin 397 is not only carried laterally from its central position, but also in a fore-and-aft direction. This being so, it follows that the carriage 399 will be moved an amount equal to the fore-and-aft travel of the pin 397. This movement is utilized to provide the desired correction for the fore-and-aft pendulum 95 in the manner which I shall now describe.

Figure 43:
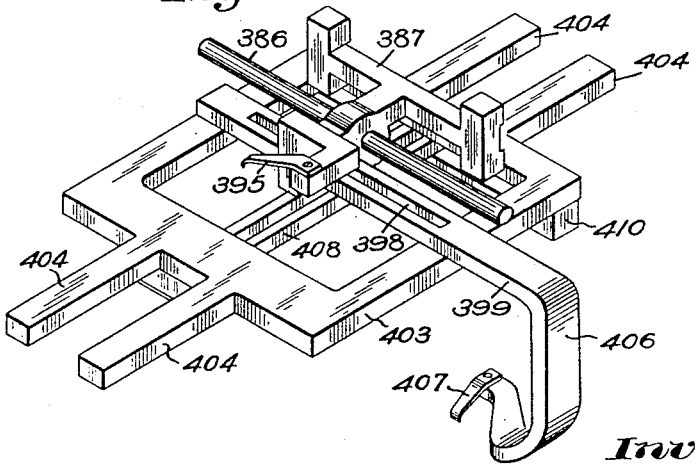
Fig. 43 is a skeletonized, perspective view of a portion of the correcting mechanism which acts on the lateral and fore and aft acceleration and retardation responsive devices.

The carriage 399 is herein provided with a depending arm 406, best shown in Figs. 6 and 43, which carries a spring 407 resting on the upper straight edge 105 of the pendulum 95. When the craft or vehicle is traveling in a path which curves neither to the right nor to the left, the free end of the spring 407 rests centrally upon the pendulum in line with its fulcrum. When, however, the path of the craft or vehicle curves to the right or left, the spring 407 is moved in one direction or the other along the pendulum a distance proportional to the centrifugal force set up by such movement of the craft or vehicle. When this occurs, (as when there is both side drift and curve to right or left), the spring presents an opposing force proportional to its distance from the fulcrum, thus tending to restore the pendulum to equilibrium. It is evident that this force may sometimes be opposed to that which is exerted by the first spring 136, hereinbefore described, and may sometimes be exerted in the same direction. In any case, the force will be so applied as to make the desired correction in a fore-and-aft direction.

It should be remembered that in order to make the correction for centrifugal force, the latter must be resolved into components laterally and longitudinally of the craft or vehicle, and these components applied to the lateral and longitudinal acceleration responsive devices as corrections. I have just described the means whereby one component is obtained and applied to the fore-and-aft responsive device, and I shall now describe the means for obtaining the other component and applying the same to the lateral responsive pendulum as a correction.

Located beneath the frame 403 is a carriage 408, best shown in Figs. 8 and 45, which is provided with a slot 409 parallel with the fore-and-aft center line. The depending pin 397, hereinbefore described, plays fore-and-aft in this slot without imparting motion to the carriage 408, but said pin, when moved laterally, under the influence of the centrifugal responsive means, moves the carriage 408 in a direction at right angles to the fore-and-aft center line, as will be evident from an inspection of Fig. 45. The carriage 408 may be supported and guided by any suitable means, but in the present example one end is supported and guided by a supporting bar 410, secured to the under side of the frame 403, as best shown in Fig. 6, while the other end of said carriage is provided with two guide rods 411, best shown in Figs. 13 and 45, which are guided by two pairs of guide rollers 412 and 413.

By reference to Fig. 45, it will be observed that the pin 397 plays to and fro laterally under the influence of the centrifugal responsive means, and hence moves the carriage 408 in a direction at right angles to the fore-and-aft center line. This movement is utilized to provide the desired correction for the lateral responsive pendulum 199, in the manner which I shall now describe.

The carriage 408 is herein provided with an arm 414, best shown in Fig. 14, which carries a spring 415, resting on the upper straight edge 205 of the pendulum 199, but in a different plane from the spring 233 hereinbefore described. When the craft or vehicle is traveling in a path which curves neither to the right nor to the left, the free end of the spring 415 rests upon the pendulum 199 in line with its fulcrum. When, however, the path of the craft or vehicle curves to the right or left, the spring 415 is moved in one direction or the other along the pendulum a distance proportional to the centrifugal force set up by such movement of the craft or vehicle. When this occurs, (which will be the case, whether or not the curve to right or left is accompanied by drift), the spring 415 presents to the pendulum an opposing force proportional to its distance from the fulcrum, thus tending to restore the pendulum to equilibrium. It is evident that this force may sometimes be opposed to that which is exerted by the spring 233 hereinbefore described, and may sometimes be exerted in the same direction, depending, of course, upon the relative locations of said springs with reference to the fulcrum of the pendulum. In any case, the force of the spring 415 will be so applied as to make the desired correction laterally.

To summarize briefly, the instrument comprises a lateral acceleration and retardation responsive and integrating device to give sidewise speed, a longitudinal acceleration and retardation responsive and integrating device to give fore-and-aft speed, a device to add these two components of speed to show the true speed and the true direction of motion relative to the longitudinal center line of the craft, a true speed integrating device to give the true distance traveled, a centrifugal force responsive correcting device maintained at right angles to the line of motion, a device to resolve the centrifugal force into components laterally and longitudinally of the craft, and means for applying these components to the lateral and longitudinal acceleration and retardation responsive devices as corrections.

*Electric circuits*, (Fig. 46.)

The electrical system may be otherwise suitably arranged, but in the present example I have shown an electrical system which I will now describe. Located preferably outside of the instrument is a suitable source of electrical current 416, from which conducting wires 417 and 418 lead to the outer pivots 419 and 420 of the gimbal ring 63, as shown in Fig. 1. The inner pivots 421 and 422, which connect the gimbal ring 63 to the casing 64, are electrically connected, respectively, with the outer pivots 419 and 420, in any suitable manner. In the present instance, the pivot 419 is insulated from the metallic framework of the instrument by insulating means best shown in Fig. 4, comprising a bushing 423 which insulates the pivot from the support 62, and two insulating blocks 424 and 425 which insulate the pivot from the gimbal ring 63. Between these blocks is secured a metallic conducting plate 426, which is in direct electrical contact with the pivot 419.

Referring now to Fig. 5, the pivot 421 is secured to but insulated from the gimbal ring 63 by a pair of insulating blocks 427 and 428, between which is interposed a metallic conducting plate 429, the latter being in direct electrical contact with the pivot 421. The latter is insulated from the casing 64 by insulating blocks 430 and 431, between which is interposed a metallic conducting plate 432, which is in direct electrical contact with the pivot 421.

Connecting the conducting plates 426 and 429 to each other is a conducting wire 433, which extends along and is supported by the gimbal ring 63, as shown in Fig. 1, but is insulated therefrom. Leading from the conducting plate 432 is another conducting wire 434, which extends into the casing of the instrument and is connected to a conducting ring 435, best shown in Figs. 6 and 46. This ring is supported on but insulated from the ring 329, hereinbefore described, by the use of an insulating ring 436, best shown in Fig. 6. Thus the conducting wire 417, leading from one pole of the source of current, is in connection through the pivot 419, plate 426, wire 433, plate 429, pivot 421, plate 432 and wire 434, with the ring 435.

Turning now to the grounded part of the system, the other conducting wire 418 is connected to the pivot 420, the latter is grounded on the gimbal ring 63, which in turn is grounded on the pivot 422, and the latter is grounded on casing 64. All of the metallic parts which are within the casing but not insulated therefrom are grounded thereon. One of these parts is the swiveled ring 325, hereinbefore described, which carries the centrifugal force responsive pendulum 372, and the solenoids 383. It follows that the pendulum 372 is in electrical connection with the ring 325, and hence is electrically connected with the wire 418, as will be evident from an inspection of Fig. 46. The contacts 379, as hereinbefore described, are connected by conducting wires 382 with one pair of ends of the solenoids 383. The other pair of ends of said solenoids is connected by conducting wire 436 to a brush 437, best shown in Fig. 46, which is insulated from and carried by the swiveled ring 325, and makes electrical contact with the conducting ring 435 at all times without interfering with the rotation of the swiveled ring 325.

It will be remembered that the contacts 107 are connected by conducting wires 110 to one pair of ends of the solenoids 111, and that the contacts 207 are connected by conducting wires 210 with one pair of ends of the solenoids 211. The remaining ends of these solenoids are connected by wires 438 and 439, respectively, with the wire 434 which is connected with the wire 418 of the other side of the circuit.

From the foregoing it must now be evident that the three pendulums 95, 199, and 372 constitute circuit making and breaking devices adapted to complete circuits to their respective pairs of solenoids, in the manner hereinbefore described, and by the use of a simple and practical electrical system, whose source of current is outside of the instrument.

*Modification*, (Figs. 53, 54 and 55.)

As regards the certainty of transmission of power from the friction disks to the friction rollers, it is evident that a hard, narrow tread is required to make definite the actual distance of the point of contact of the roll and disk from the center of the latter. This may tend to cause slippage between the driving and driven parts. On the other hand, the more the pressure which is applied to prevent such slippage, the greater will be the power required to slide the roll radially under the impulse of the solenoids. This situation may easily be met by utilizing energy from another source to drive the mechanism actuated by the friction roller instead of having the latter do the driving itself.

This may be accomplished in many ways but in the present example I have shown in Figs. 53, 54 and 55 a modification in which the real work is done by the application of power from an outside source of energy, while the application of such power is dependent on the friction wheel for control only. This feature may be applied to either or both of the differential driven mechanisms and at any convenient point in either, but for purposes of exemplification I shall consider the same as applied to the differential mechanism shown in Figs. 22 to 28 inclusive. It will be remembered that this mechanism drives a pinion rod 156 and the latter drives a worm 160 shown in Fig. 51 wherein the pinion rod is secured to the worm. This is one convenient point for bringing in power from another source and this may be done by interposing between the pinion rod and the worm, the mechanism which I shall now describe.

In this case, the pinion rod 156 and worm 160, instead of being secured to each other, are separate as best shown in Fig. 54, and power is supplied to the worm by a suitable motor 440 having a shaft 441 which may drive the worm 160 through any suitable means. In the present example there is formed on or secured to the shaft 441 a worm 442 meshing with and driving a worm gear 443, the latter being formed on or secured to the worm 160. Now by controlling the operation of the motor by suitable means under the control of the pinion rod 156, the power of the motor may be utilized to rotate the worm 160 in accordance with the rotation of the pinion rod.

This may be accomplished by providing a common form of electric motor having a field diagrammatically represented at 444 and an armature 445 with which two brushes 446 and 447 coöperate. The brush 446 is directly connected by a wire 448 to one pole of a suitable source of current 449 to the other pole of which is connected a wire 450. Another wire 451 leads from the second brush 447. The wires 450 and 451 are connected to brushes 452 and 453, respectively, which bear on conducting rings 454 and 455 carried by but insulated from the worm 160 and from each other by an insulating sleeve 456.

Also carried by the worm 160 is a commutator having two conducting segments 457 and 458 insulated from the worm and from each other by the sleeve 456 and connected to the rings 454 and 455 by conductors 459 and 460 represented diagrammatically in the drawings. Coöperating with the commutator are two brushes 461 and 462 carried by and insulated from the pinion rod 156 as by means of an insulating sleeve 463 having two arms 464 and 465 to which the respective brushes are secured.

Also carried by the pinion rod 156 are two conducting rings 466 and 467 insulated therefrom and from each other by the sleeve 463, and connected to the brushes 461 and 462, respectively, by conductors 468 and 469 diagrammatically represented in the drawings. Coöperating with the conducting rings 466 and 467 are brushes 470 and 471 connected, respectively, by wires 472 and 473 to the field winding 444 of the motor 440.

Thus it will be understood that as the pinion rod 156 is rotated by the friction rollers and friction disk, current flows through the field and armature windings of the motor and causes the latter to drive the worm 160. This will continue so long as the rotation of the pinion rod continues and consequently so long as the brushes 461 and 462 continue to make contact with the segments 457 and 458. When, however, the pinion rod 156 ceases to rotate, the segments will over-run their respective brushes and the latter will then rest upon the interposed insulating segments 474 and 475, whereupon the circuit of the motor is broken and the latter stops. The wiring is such that when the motion of the pinion rod is reversed, the rotation of the motor will be reversed and the worm will be driven in the opposite direction.

Thus it is apparent that the rotation of the differential mechanism is relayed to the mechanism controlled thereby by the interposition of another source of energy which is supplied under the control of the differential mechanism. The friction wheels and disk then have so little work to do that there is no danger of slippage.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described one embodiment of my invention, what I claim and desire by Letters Patent to secure is:

1. In an instrument for ascertaining characteristics of motion of a moving body which carries the instrument, the combination of means responsive to acceleration and retardation of said body to give the acceleration or retardation, and means for integrating with respect to time the acceleration or retardation so found.

2. In an instrument for ascertaining characteristics of motion of a moving body which carries the instrument, the combination of means responsive to forces set up by inertia for measuring the acceleration and retardation of said body, and means for integrating with respect to time the acceleration or retardation so found.

3. In an instrument for ascertaining characteristics of motion of a moving body which carries the instrument, the combination of means responsive to lateral acceleration and retardation to give lateral speed, and means responsive to longitudinal acceleration and retardation to give longitudinal speed.

4. In an instrument for ascertaining characteristics of motion of a moving body which carries the instrument, the combination of means responsive to lateral acceleration and retardation to give lateral speed, means responsive to longitudinal acceleration and retardation to give fore-and-aft speed, and means to add vectorially these two components of speed to show the true speed.

5. In an instrument for ascertaining characteristics of motion of a moving body which carries the instrument, the combination of means responsive to lateral acceleration and retardation, means responsive to longitudinal acceleration and retardation, and means operated by both responsive means to give true direction of motion of the moving body.

6. In an instrument for ascertaining characteristics of motion of a moving body which carries the instrument, the combination of means responsive to lateral acceleration and retardation to give lateral speed, means responsive to longitudinal acceleration and retardation to give fore-and-aft speed, and means operated by both responsive means to show the true speed and direction of motion of the moving body.

7. In an instrument for ascertaining characteristics of motion of a moving body which carries the instrument, the combination of means responsive to forces set up by inertia to give the speed of the moving body, and speed integrating means connected thereto to give the distance traveled by the moving body.

8. In an instrument for ascertaining characteristics of motion of a moving body which carries the instrument, the combination of means for measuring the acceleration and retardation of said body, means for integrating with respect to time the acceleration or retardation so found to ascertain the speed, and means for integrating with respect to time the speed so found thereby to ascertain the distance traveled.

9. In an instrument for ascertaining characteristics of motion of a moving body which carries the instrument, the combination of means for measuring a component of the acceleration and retardation of said body, means for integrating with respect to time said component of the acceleration or retardation so found to ascertain the speed, and means for integrating with respect to time the speed so found thereby to ascertain the distance traveled.

10. In an instrument for ascertaining characteristics of motion of a moving body which carries the instrument, the combination of means for measuring and integrating with respect to time two components of acceleration or retardation of said body at an angle to each other to give the components of velocity in two directions, and means for compounding the components of velocities so found thereby to ascertain the true velocity.

11. In an instrument for ascertaining characteristics of motion of a moving body which carries the instrument, the combination of means for measuring and integrating with respect to time two components of acceleration or retardation of said body at an angle to each other to give the components of velocity in two directions, means for compounding the components of velocities so found thereby to ascertain the true velocity, and means for measuring and indicating the angle the direction of true velocity makes with a line fixed with respect to said body.

12. In an instrument for ascertaining characteristics of motion of a moving body which carries the instrument, the combination of means for measuring and integrating with respect to time two components of acceleration or retardation of said body at an angle to each other to give the components of velocity in two directions, means for compounding the components of velocities so found thereby to ascertain the true velocity, and means for integrating the true velocity with respect to time to give the true distance traveled.

13. In an instrument for ascertaining characteristics of motion of a moving body which carries the instrument, the combination of means for measuring and integrating with respect to time two components of acceleration or retardation of said body at an angle to each other to give the components of velocity in two directions, means for compounding the components of velocities so found thereby to ascertain the true velocity, means for measuring and indicating the angle which the direction of true velocity makes with a line fixed with respect to said body, and means for integrating the true velocity with respect to time to give the distance traveled.

14. In an instrument for ascertaining characteristics of motion of a moving body which carries the instrument, the combination of means responsive to forces set up by inertia for measuring the components of lateral acceleration and retardation of said body, and means to correct said responsive means for the effect of centrifugal force.

15. In an instrument for ascertaining characteristics of motion of a moving body which carries the instrument, the combination of inertia responsive means for measuring the components of longitudinal acceleration and retardation of said body, and means to correct said responsive means for the effect of centrifugal force.

16. In an instrument for ascertaining characteristics of motion of a moving body which carries the instrument, the combination of inertia responsive means for measuring the lateral acceleration and retardation of said body, inertia responsive means for measuring the components of fore-and-aft acceleration and retardation of said body, and means to correct said responsive means for the effect of centrifugal force.

17. In an instrument for ascertaining characteristics of motion of a moving body which carries the instrument, the combination of a lateral acceleration and retardation responsive device to give lateral speed, a longitudinal acceleration and retardation responsive device to give fore-and-aft speed, a device to add these two components of speed to show the true speed and direction of motion relative to the fore-and-aft center line of said body, a true speed integrating device to give the true distance traveled, a centrifugal force measuring device responsive to acceleration and retardation operating in a direction at right angles to the true direction of motion of said body, a device to resolve the centrifugal force into components laterally and longitudinally of said body and means for applying these components to said lateral and longitudinal responsive devices as corrections.

18. In an instrument for ascertaining characteristics of motion of a moving body which carries the instrument, the combination of a lateral acceleration and retardation responsive device to give lateral speed, a longitudinal acceleration and retardation responsive device to give fore-and-aft speed, a device to add these two components of speed to show the true speed of motion relative to the fore-and-aft center line of said body, a true speed integrating device to give the true distance traveled, a centrifugal force responsive device operating in a direction at right angles to the true direction of motion of said body, a device to resolve the centrifugal force into components laterally and longitudinally of said body and means for applying these components to said lateral and longitudinal responsive devices as corrections.

19. In an instrument to ascertain the magnitude of the longitudinal and transverse components of the velocity of a body, the combination of means for producing uniform motion independently of the motion of said body, means responsive to acceleration and retardation in the direction of the force of each of said components to produce proportional motions, and means to integrate said proportional motions with respect to time, using said uniform motion means as a basis of time.

20. In an instrument for continuously indicating the varying velocity of a moving mass which carries said instrument, the combination of means for producing uniform motion independently of the motion of said mass, means responsive to the varying force of acceleration and retardation to produce proportional motion, the last-mentioned means having provision to vary the driving ratio between said uniform motion means and a driven means, the latter having provision for integrating such proportional motion.

In testimony whereof I have signed my name to this specification.

JOHN D. ROBERTSON.